US012634989B2

(12) United States Patent
Sugaya et al.

(10) Patent No.: US 12,634,989 B2
(45) Date of Patent: May 19, 2026

(54) COMMUNICATION DEVICE AND COMMUNICATION METHOD

(71) Applicant: Sony Group Corporation, Tokyo (JP)

(72) Inventors: Shigeru Sugaya, Tokyo (JP); Yusuke Tanaka, Tokyo (JP); Ryuichi Hirata, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 608 days.

(21) Appl. No.: 18/004,882

(22) PCT Filed: Jul. 2, 2021

(86) PCT No.: PCT/JP2021/025086
§ 371 (c)(1),
(2) Date: Jan. 10, 2023

(87) PCT Pub. No.: WO2022/014367
PCT Pub. Date: Jan. 20, 2022

(65) Prior Publication Data
US 2023/0247674 A1     Aug. 3, 2023

(30) Foreign Application Priority Data
Jul. 17, 2020     (JP) ................................. 2020-123090

(51) Int. Cl.
*H04W 74/08*          (2024.01)
*H04W 74/0808*      (2024.01)
*H04W 74/0833*      (2024.01)
(52) U.S. Cl.
CPC ... *H04W 74/0808* (2013.01); *H04W 74/0833*
(2013.01)

(58) Field of Classification Search
CPC ......... H04W 28/0231; H04W 28/0236; H04W 28/06; H04W 28/08; H04W 28/09; H04W 72/12; H04W 74/0808; H04W 74/0833
See application file for complete search history.

(56) References Cited

U.S. PATENT DOCUMENTS

| | | | |
|---|---|---|---|
| 7,333,435 B2 * | 2/2008 | Gerkis | H04L 47/22 |
| | | | 370/230.1 |
| 7,707,303 B2 * | 4/2010 | Albers | H04L 47/263 |
| | | | 709/231 |

(Continued)

FOREIGN PATENT DOCUMENTS

| | | |
|---|---|---|
| EP | 3085172 A | 10/2016 |
| JP | 10-271140 A | 10/1998 |

(Continued)

OTHER PUBLICATIONS

International Search Report and Written Opinion mailed on Sep. 21, 2021, received for PCT Application PCT/JP2021/025086, filed on Jul. 2, 2021, 15 pages including English Translation.

*Primary Examiner* — Alpus Hsu
(74) *Attorney, Agent, or Firm* — XSENSUS LLP

(57) ABSTRACT

A communication device that includes a control unit that performs control to estimate a transmission capacity to repeatedly transmit data of a specific attribute by a predetermined amount of information at each of a plurality of predetermined transmission intervals, and determine, in a case where a transmission opportunity is acquired by random access control with another communication device, a predetermined transmission capacity to be transmitted according to an elapsed time of a predetermined transmission interval, and transmit the data of the specific attribute.

14 Claims, 27 Drawing Sheets

(56)                    References Cited

U.S. PATENT DOCUMENTS

| | | | |
|---|---|---|---|
| 9,094,835 B2 * | 7/2015 | Persson ................. | H04W 16/14 |
| 9,553,950 B2 * | 1/2017 | Muramoto .............. | H04W 4/38 |
| 2006/0062171 A1 * | 3/2006 | Baiamonte .......... | H04L 47/2416 |
| | | | 370/328 |
| 2008/0123531 A1 * | 5/2008 | Gerkis ................. | H04W 28/10 |
| | | | 370/235 |
| 2014/0269534 A1 | 9/2014 | Persson | |
| 2020/0068585 A1 * | 2/2020 | Yoshikawa ........... | H04W 24/10 |
| 2022/0015024 A1 * | 1/2022 | Tanaka .............. | H04W 72/0453 |

FOREIGN PATENT DOCUMENTS

| | | |
|---|---|---|
| JP | 2004-248263 A | 9/2004 |
| JP | 2006-86605 A | 3/2006 |
| JP | 2011-188451 A | 9/2011 |
| JP | 2019-21992 A | 2/2019 |
| JP | 2019-512928 A | 5/2019 |
| JP | 2019-531632 A | 10/2019 |

* cited by examiner

Figure 14:
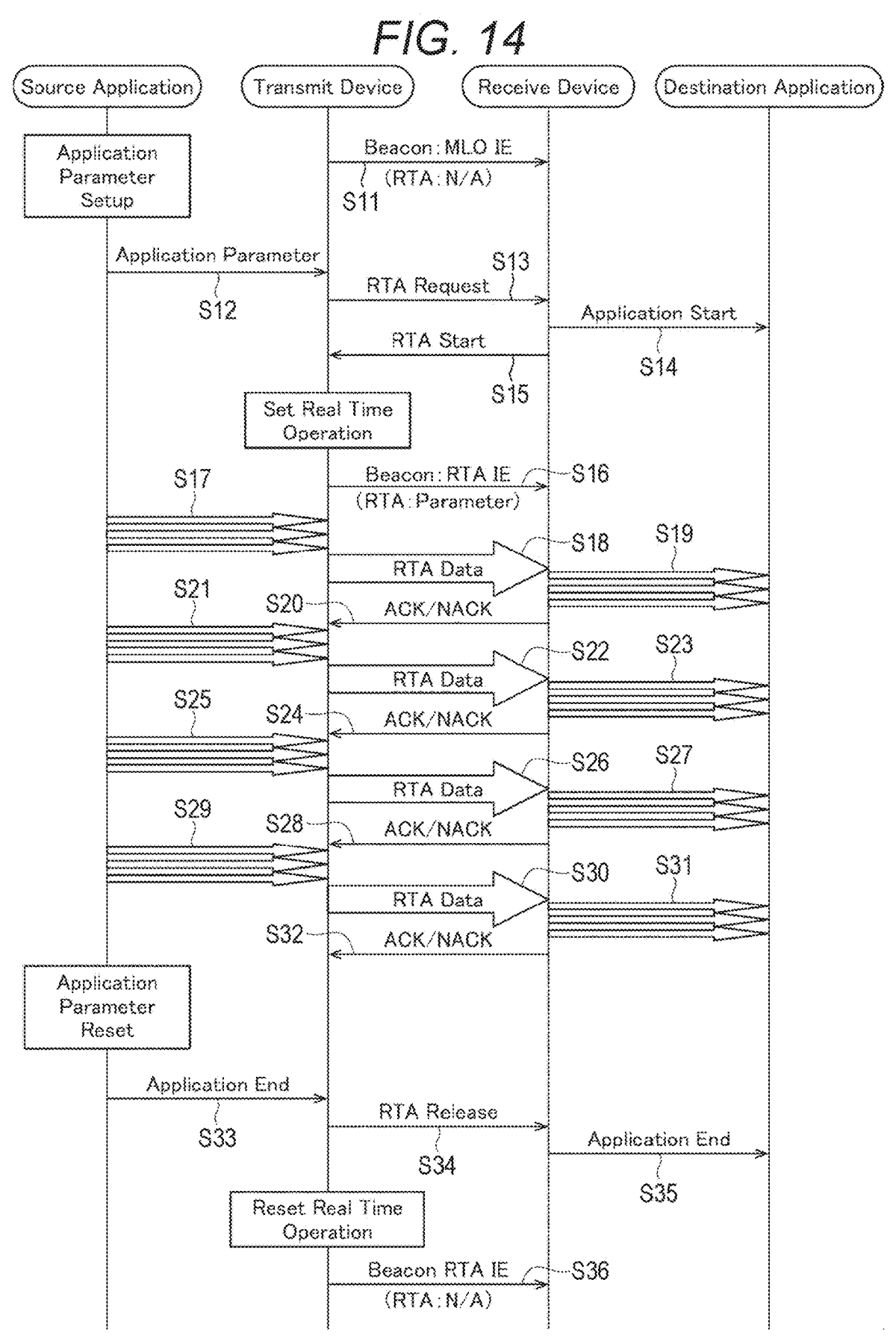

Source Application    Transmit Device    Receive Device    Destination Application Application Parameter Setup Beacon: MLO IE
(RTA: N/A)
S11

Application Parameter

S13

S12

RTA Request

Application Start

RTA Start

S14

S15

Set Real Time Operation

S17

Beacon: RTA IE   S16
(RTA: Parameter)

S18   S19

RTA Data

S21    S20

ACK/NACK

S22   S23

RTA Data

S25    S24

ACK/NACK

S26   S27

RTA Data

S29    S28

ACK/NACK

S30   S31

RTA Data

S32

ACK/NACK

Application Parameter Reset

Application End

RTA Release

Application End

S33

S34

S35

Reset Real Time Operation

Beacon RTA IE   S36
(RTA: N/A)

*FIG. 18*

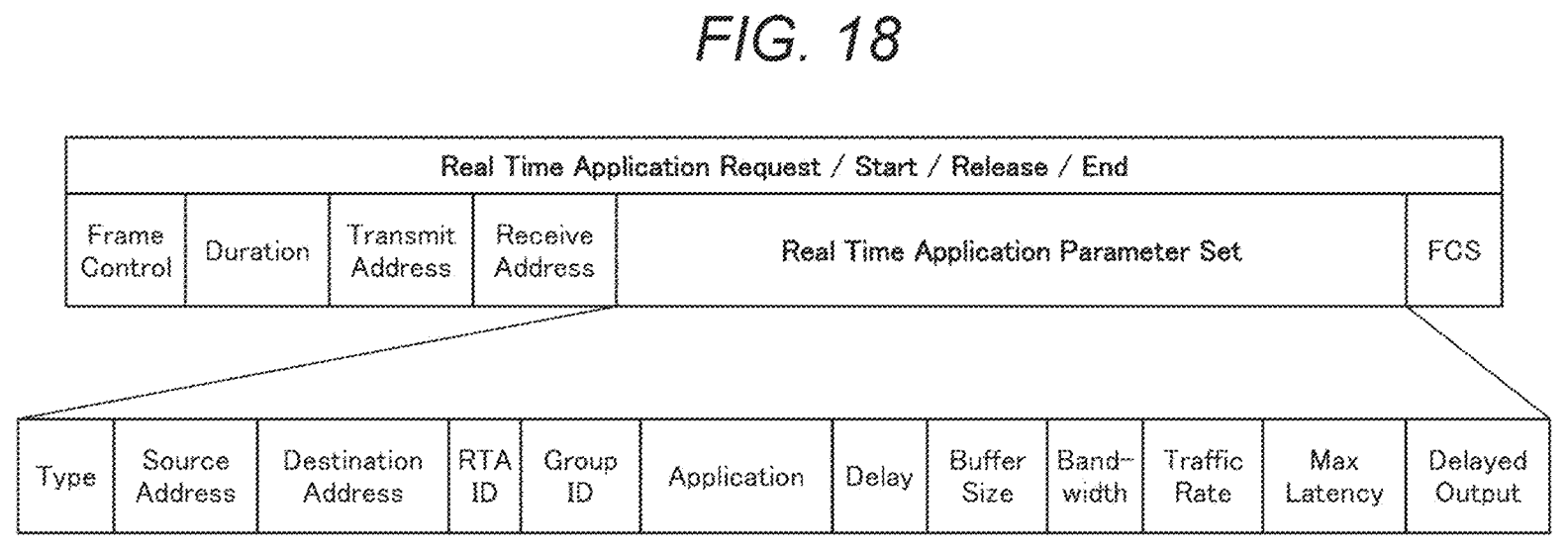

| | | | | Real Time Application Request / Start / Release / End | | |
| --- | --- | --- | --- | --- | --- | --- |
| Frame Control | Duration | Transmit Address | Receive Address | Real Time Application Parameter Set | | FCS |

| Type | Source Address | Destination Address | RTA ID | Group ID | Application | Delay | Buffer Size | Band-width | Traffic Rate | Max Latency | Delayed Output |
| --- | --- | --- | --- | --- | --- | --- | --- | --- | --- | --- | --- |

FIG. 19

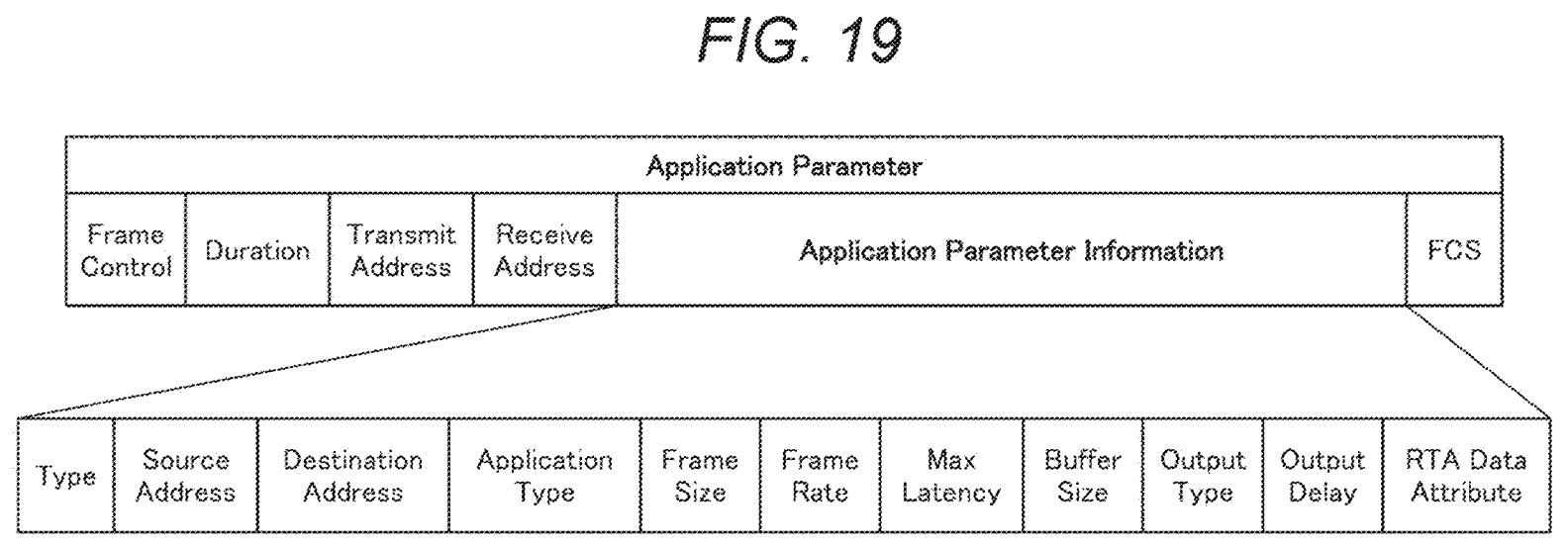

| Application Parameter | | | |
|---|---|---|---|
| Frame Control | Duration | Transmit Address | Receive Address | Application Parameter Information | FCS |

| Type | Source Address | Destination Address | Application Type | Frame Size | Frame Rate | Max Latency | Buffer Size | Output Type | Output Delay | RTA Data Attribute |
|---|---|---|---|---|---|---|---|---|---|---|

*FIG. 20*

| Real Time Application Information Element(RTA IE) | | | | | | | | |
|---|---|---|---|---|---|---|---|---|
| Element ID | Length | Type | Maximum Latency | Average Latency | Available Channel | Transmit Capacity | Transmit Interval | Maximum Duration | Num of RTA IDs | RTA ID | ... |

COMMUNICATION DEVICE AND COMMUNICATION METHOD

CROSS-REFERENCE TO RELATED APPLICATIONS

The present application is based on PCT filing PCT/JP2021/025086, filed Jul. 2, 2021, which claims priority to JP 2020-123090, filed Jul. 17, 2020, the contents of each are hereby incorporated by reference.

TECHNICAL FIELD

The present technology relates to a communication device and a communication method, and more particularly relates to a communication device and a communication method capable of more appropriately preferentially transmitting data of a specific attribute.

BACKGROUND ART

In a wireless local area network (LAN) system, a network is constructed and operated among a plurality of communication devices, and thus an access control method has been employed in which any communication device can transmit data after a predetermined random transmission waiting time elapses.

Furthermore, when data for a real time application is transmitted, a shorter latency is required, and thus it is required to preferentially transmit the data over other data. As a technique for preferentially transmitting such data, for example, techniques disclosed in Patent Documents 1 and 2 are known.

Patent Document 1 discloses a configuration in which a scheduling means adds information regarding a new priority calculated by scheduling to data anew, and a transmission control means sets a transmission waiting time on the basis of the information regarding the new priority added to the data stored in a transmission queue.

Patent Document 2 discloses a technique of extracting attribute information from a plurality of packets received by a plurality of communication protocols, determining a priority order common to the plurality of communication protocols for the plurality of packets on the basis of a configuration of the extracted attribute information, and processing the packets on the basis of the determined priority order.

CITATION LIST

Patent Document

Patent Document 1: Japanese Patent Application Laid-Open No. 2011-188451
Patent Document 2: Japanese Patent Application Laid-Open No. 2019-021992

SUMMARY OF THE INVENTION

Problems to be Solved by the Invention

Incidentally, in an environment where a random access control delay occurs such as a wireless LAN system, when data requiring a shorter latency is transmitted as data to be prioritized, there is a case where the data cannot be preferentially transmitted, and a technique for more appropriately preferentially transmitting data of a specific attribute has been required.

The present technology has been made in view of such a situation, and enables data of a specific attribute to be preferentially transmitted more appropriately.

Solutions to Problems

A communication device according to one aspect of the present technology is a communication device including a control unit that performs control to estimate a transmission capacity to repeatedly transmit data of a specific attribute by a predetermined amount of information at each predetermined transmission interval, and determine, in a case where a transmission opportunity is acquired by random access control with another communication device, a predetermined transmission capacity to be transmitted according to an elapsed time of a predetermined transmission interval, and transmit the data of the specific attribute.

A communication method according to one aspect of the present technology is a communication method including estimating a transmission capacity to repeatedly transmit data of a specific attribute by a predetermined amount of information at each predetermined transmission interval, and determining, in a case where a transmission opportunity is acquired by random access control with another communication device, a predetermined transmission capacity to be transmitted according to an elapsed time of a predetermined transmission interval, and transmitting the data of the specific attribute.

In the communication device and the communication method according to one aspect of the present technology, a transmission capacity to repeatedly transmit data of a specific attribute by a predetermined amount of information at each predetermined transmission interval is estimated, and in a case where a transmission opportunity is acquired by random access control with another communication device, a predetermined transmission capacity to be transmitted according to an elapsed time of a predetermined transmission interval is determined, and the data of the specific attribute is transmitted.

A communication device according to one aspect of the present technology is a communication device including a control unit that sets reception of data of a specific attribute by specifying a transmission side communication device and a reception side communication device of data and exchanging communication parameters, and periodically receives the data of the specific attribute having a predetermined transmission capacity at each predetermined transmission interval.

A communication method according to one aspect of the present technology is a communication method including, by a communication device, setting reception of data of a specific attribute by specifying a transmission side communication device and a reception side communication device of data and exchanging communication parameters, and controlling periodic reception of the data of the specific attribute having a predetermined transmission capacity at each predetermined transmission interval.

In the communication device and the communication method according to one aspect of the present technology, reception of data of a specific attribute is set by specifying a transmission side communication device and a reception side communication device of data and exchanging communication parameters, and the data of the specific attribute having a predetermined transmission capacity is periodically received at each predetermined transmission interval.

Note that the communication device according to one aspect of the present technology may be an independent device or an internal block constituting one device.

BRIEF DESCRIPTION OF DRAWINGS

FIG. 4 is a diagram illustrating a configuration using a transmission buffer for data requiring low latency by a real time application.

FIG. 6 is a diagram illustrating a modification example in a case where data of the real time application is preferentially transmitted.

FIG. 14 is a diagram illustrating an example of a sequence of real time application communication.

FIG. 18 is a diagram illustrating an example of a configuration of a command related to setup of the real time application.

FIG. 19 is a diagram illustrating an example of parameters of an application.

FIG. 20 is a diagram illustrating an example of a configuration of an information element for providing notification of a setting of the real time application.

MODE FOR CARRYING OUT THE INVENTION

1. Embodiments of Present Technology

Figure 1:
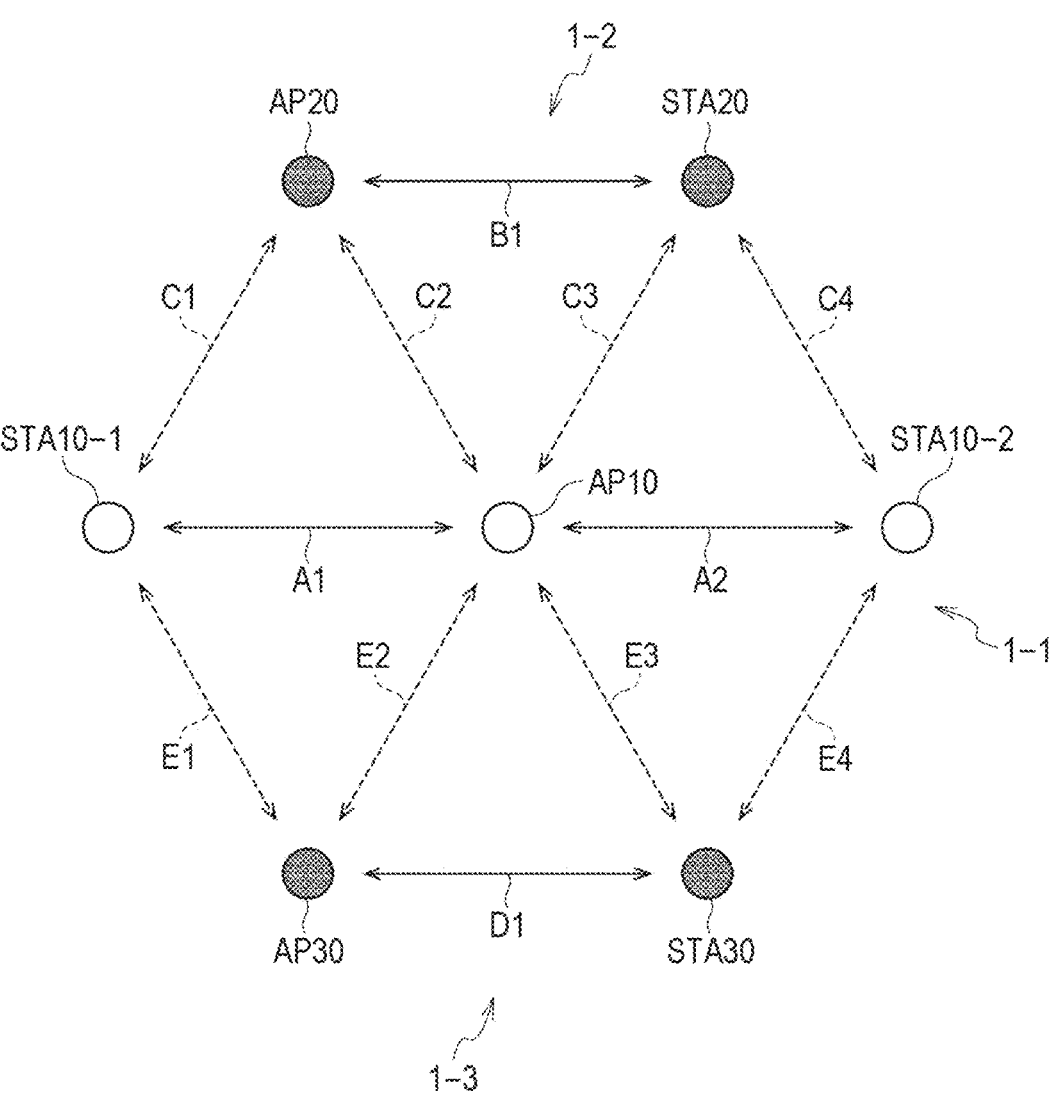
FIG. 1 is a diagram illustrating an example of a configuration of a wireless communication network by a wireless communication system to which the present technology is applied.

Conventionally, in a wireless LAN system, since a network is constructed and operated among a plurality of communication devices, an access control method has been employed in which any communication device can transmit data after a predetermined random transmission waiting time elapses.

Alternatively, a method has been devised in which a broadband channel is secured in advance so that congestion does not occur in transmission on a communication channel, and data is transmitted with a short transmission waiting time by using any channel.

On the other hand, in a public communication system standardized by the Third Generation Partnership Project (3GPP), a specific communication carrier is responsible for management of communication resources thereof, and thus desired data can be transmitted without delay within a predetermined delay time determined by the carrier.

These communications are in a system in which frequency resources are allocated from a base station to a communication terminal and used, and thus it is easy to provide a mechanism for transmitting data from a specific communication device without delay if the frequency resources are allocated.

That is, in the public communication system, frequency resources can be fully used, and thus a technique has been generally used in which a communication channel for control is secured in advance, and a channel related to data transmission is set using this control channel.

In the wireless LAN system to which a wireless communication protocol of the IEEE 802.11 system is applied, even in a case where data for a real time application is transmitted, it is demanded to fairly use a transmission path with other wireless communication devices as defined by a conventional wireless communication protocol.

In particular, the IEEE 802.11 specification discloses a technique of setting a transmission waiting time on the basis of an access category (AC) of data to be transmitted by enhanced distributed channel access (EDCA) control.

Therefore, as a next-generation technology of IEEE 802.11, there is disclosed a technique capable of storing data requiring low latency in a dedicated transmission buffer and transmitting the data preferentially over other data.

As already described, Patent Document 1 described above discloses a technique in which a scheduling means adds information regarding a new priority calculated by scheduling to data anew, and a transmission control means sets a transmission waiting time on the basis of the information regarding the new priority added to the data stored in a transmission queue.

As already described, Patent Document 2 described above discloses a technique of extracting attribute information from a plurality of packets received by a plurality of communication protocols, determining a priority order common to the plurality of communication protocols for the plurality of packets on the basis of a configuration of the extracted attribute information, and processing the packets on the basis of the determined priority order.

According to the technology disclosed in IEEE 802.11-19/1851 r1, a technology is disclosed in which, in a case of transmission using a plurality of links, a Link Load is defined for each link, only data with a low latency is transmitted in a link with a high Link Load (Link #2), and both the data with a low latency and other data are transmitted in a link with a low Link Load (Link #1).

Incidentally, in a case of the wireless LAN system, if there are many communication devices waiting for transmission in the surroundings of an own device, there is a case where transmission from another communication device is performed even after the random transmission waiting time elapses, and the own device cannot perform its own transmission.

Thus, it has been considered that it is difficult to quickly transmit data that needs reliability and is demanded to be transmitted within a predetermined delay time.

In particular, in a case where input of a password is required on the basis of temporal restriction, and the like, it has been required to transmit such data that needs high reliability in a time as short as possible.

Moreover, in the wireless LAN system, in order to cause data transmission from other communication devices to be performed fairly, once the data transmission ends, data cannot be transmitted again unless a predetermined transmission waiting time is reset, and thus there is a problem that the delay does not converge endlessly due to this reset of the transmission waiting time.

Furthermore, in a case of the wireless LAN system, data is transmitted if data transmission is not performed around the transmission side communication device, but there is a problem that this data cannot be correctly decoded if communication is performed around the reception side communication device.

On the other hand, in the public communication system, it is easy to provide a mechanism for transmitting data from a specific communication device without delay, but in order to perform the communication, there is a problem that it is necessary to be incorporated into a network provided by a specific communication carrier and to pay a predetermined usage cost, which is costly.

Furthermore, in recent years, use of abundant frequency resources has increased due to explosive demand for data communication, and it has become difficult to secure a channel for data communication.

In the definition of the priority order of data transmission in the conventional wireless LAN system, the order is determined according to the access category of the data to be transmitted, and thus transmission control is performed on the data for which a short latency is required by the real time application on the basis of this mechanism.

Thus, for data transmitted in the real time application, in a case where there is data with a high priority in another access category, there is a possibility that transmission of the data is prioritized and a desired latency requirement can no longer be satisfied.

Also in the technical proposal capable of solving these problems, in the technology of storing data requiring a low latency in a dedicated transmission buffer and transmitting the data preferentially over other data, only the data stored in the buffer is set with a short transmission waiting time, and thus there is a problem that a transmission opportunity for data other than the data does not arrive.

Furthermore, if the data is not stored in the transmission buffer, the data is not preferentially transmitted, and in a case where the data used in the real time application is received, there is a problem that the data cannot be received at a desired timing unless the data is preferentially transmitted by the communication device on the transmission side.

Conversely, if only data transmitted by the real time application is preferentially transmitted, there is unfairness that transmission cannot be performed according to a priority order based on a conventional access category.

Furthermore, in a case where voice data, video data, and control information of the real time application are mixed, when transmission is performed on the basis of the priority order of conventional EDCA control, the voice data, the video data, and the control information are transmitted in this order, and there is a problem that the transmission order is rearranged in the transmission path of the wireless LAN even if the application issues a transmission request at the same timing.

According to the technique described in Patent Document 1 described above, the transmission waiting time is uniformly set for data on the basis of information regarding a new priority set by a priority analysis processing unit, and thus there is a problem that transmission is performed first every time from data that is set with the highest priority.

In the technique described in Patent Document 2 described above, since received data is transferred to the upper layer according to the priority order determined by a common priority order determination unit, there is a problem that the priority order determined once cannot be changed.

In the technique disclosed in IEEE 802.11-19/1851 r1, since the Link Load is defined for each link, there remains a problem that only data with a low latency is transmitted on the link with a high Link Load (Link #2), and other data cannot be transmitted.

Accordingly, in the present technology, a configuration is proposed in which, in a case where a transmission opportunity is acquired by random access control with another communication device, a predetermined transmission capacity to be transmitted is determined according to an elapsed time of a predetermined transmission interval, and data having a specific attribute such as data of the real time application is transmitted, and thus the above-described problem can be solved.

Hereinafter, embodiments of the present technology will be described with reference to the drawings.

(Configuration of Network)

FIG. 1 illustrates an example of a configuration of a wireless communication network by a wireless communication system to which the present technology is applied. Here, a configuration of a wireless LAN system is illustrated as an example of the wireless communication system.

In FIG. 1, communication devices 10 constituting a wireless LAN system 1-1 are indicated by white circles in the drawing, and solid arrows A1 and A2 in the drawing indicate that the respective communication devices 10 are communicable in a state where a communication terminal STA10-1 and a communication terminal STA10-2 are connected to an access point AP10.

In the vicinity of the wireless LAN system 1-1, an access point AP20 and a communication terminal STA20 indicated by shaded circles in the drawing constitute another wireless LAN system 1-2, and a solid arrow B1 in the drawing indicates that the respective communication devices 20 are communicable.

Furthermore, in the vicinity of the wireless LAN system 1-1, an access point AP30 and a communication terminal STA30 indicated by shaded circles in the drawing further constitute another wireless LAN system 1-3, and a solid arrow D1 in the drawing indicates that the respective communication devices 30 are communicable.

The access point AP10 is present at a position where signals from the access point AP20 and the communication terminal STA20 and signals from the access point AP30 and the communication terminal STA30 can be received, which are represented by dashed arrows C2 and C3 and arrows E2 and E3 in the drawing.

The communication terminal STA10-1 is present at a position where signals from the access point AP20 and the access point AP30 can be received, which are represented by a dashed arrow C1 and an arrow E1 in the drawing. Furthermore, the communication terminal STA10-2 is present at a position where signals from the communication terminal STA20 and the communication terminal STA30 can be received, which are represented by a dashed arrow C4 and an arrow E4 in the drawing.

As described above, the access point AP10, the communication terminal STA10-1, and the communication terminal STA10-2 constituting the wireless LAN system 1-1 need to perform fair access between these communication devices due to the existence of the wireless LAN system 1-2 and the wireless LAN system 1-3.

Note that, hereinafter, a communication device that transmits data will be referred to as a transmission side communication device, and a communication device that receives data will be referred to as a reception side communication device. For example, in the wireless LAN system 1-1, data transmitted from a transmission side communication device 10Tx such as the access point AP10 is received by a reception side communication device 10Rx such as the communication terminal STA10-1.

(Example of Frequency Band and Channel Allocation)

Figure 2:
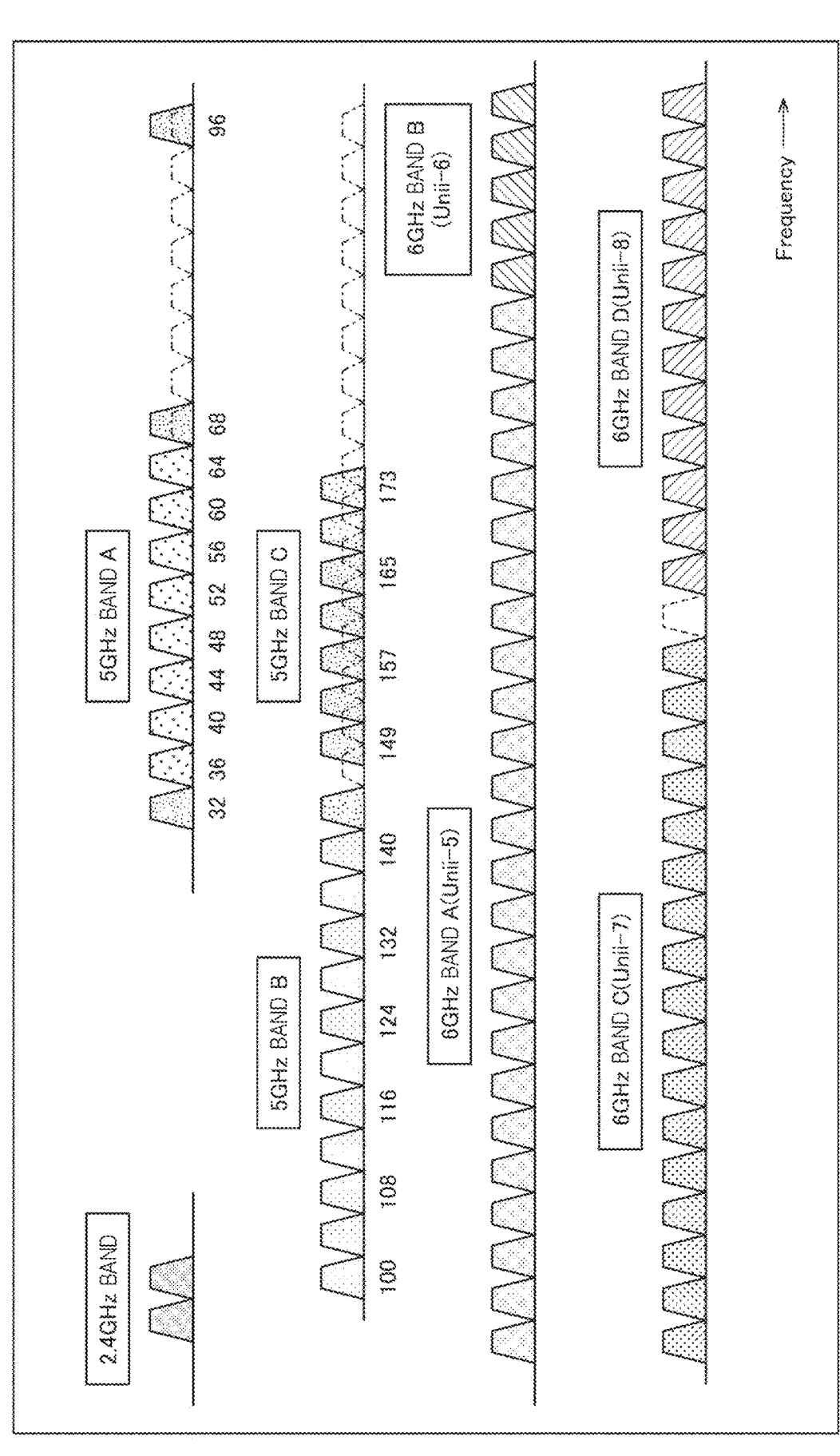
FIG. 2 is a diagram illustrating an example of frequency band and frequency channel allocation used in the wireless communication system to which the present technology is applied.

FIG. 2 illustrates an example of frequency band and frequency channel allocation used in a wireless communication system to which the present technology is applied.

In the 2.4 GHz band, in a case of applying to a wireless signal of an orthogonal frequency division multiplexing (OFDM) method with 20 MHz bandwidth in the IEEE 802.11g standard, frequencies for at least two channels are set ("2.4 GHz band" in the uppermost stage (first stage) in the drawing).

In the 5 GHz band, it is possible to secure a plurality of frequency channels to be applied to a wireless signal of an OFDM method with 20 MHz bandwidth for a standard such as IEEE 802.11a ("5 GHz band A, B, C" in the first and second rows in the drawing).

Here, the operation in the 5 GHz band is provided with conditions for determining an available frequency band, transmission power, and transmission possibility in the legal systems of respective countries.

Channel numbers 32, 36, 40, . . . , and so on are assigned to the first and second rows in FIG. 2, and eight channels of channels 36 to 64 and 11 channels of channels 100 to 140 can be used in Japan.

Note that, in other countries and regions except for Japan, the channel 32, the channel 68, the channel 96, and the channel 144 can also be used, and further, in the frequency band thereabove, the channels 149 to 173 can be used.

Furthermore, currently, 6 GHz bands are being standardized as available frequency bands ("6 GHz bands A, B, C, and D" in the third and fourth rows in the drawing). As a method of using the 6 GHz band, 25 channels can be arranged in the Unii-5 band of the 6 GHz band A, five channels can be arranged in the Unii-6 band of the 6 GHz band B, 17 channels can be arranged in the Unii-7 band of the 6 GHz band C, and 12 channels can be arranged in the Unii-8 band of the 6 GHz band D.

Figure 3:
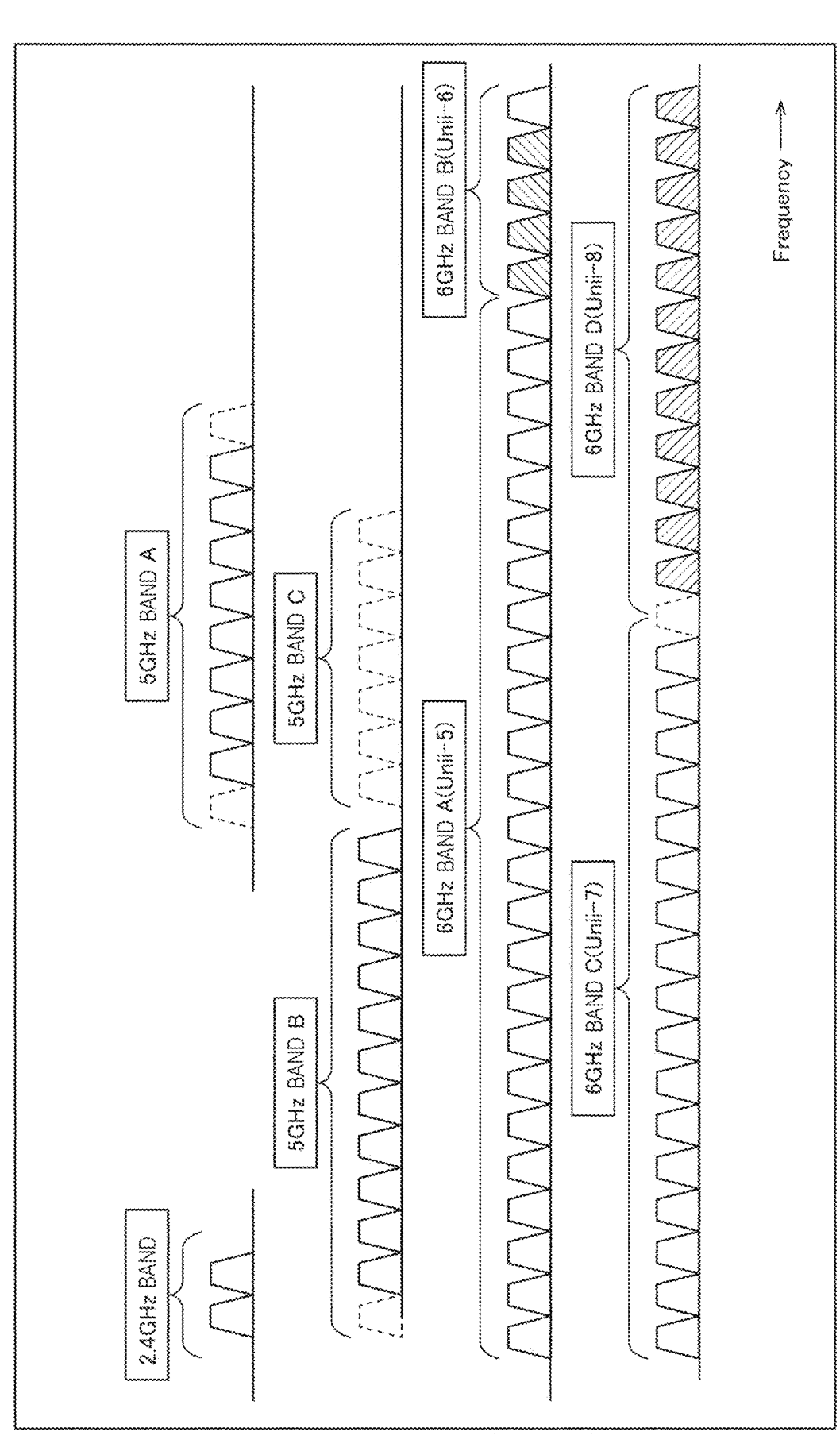
FIG. 3 is a diagram illustrating an example of a configuration in which frequency channels having predetermined bandwidths are divided and used.

FIG. 3 illustrates a configuration in which frequency channels having predetermined bandwidths are divided and used by combining freely available bands while avoiding use of bands whose use is restricted.

FIG. 3 illustrates an example in which, as the band that can be freely used, a bandwidth of 80 MHz is secured for four channels of the Unii-6 band of 6 GHz band B to form a first link (Link #1), a bandwidth of 240 MHz is secured for 12 channels of the Unii-8 band of 6 GHz band D to form a second link (Link #2), and these links of a plurality of bandwidths are combined to use a bandwidth of 320 MHz for the total of 16 channels.

In a case of such a use configuration of the frequency channel, there is a possibility that different systems are operated in the periphery in the first link (Link #1) and the second link (Link #2), and access control is individually performed.

For example, in FIG. 1, in a case where the wireless LAN system 1-1 performs communication using a plurality of links (multi-links) of the first link and the second link, when the wireless LAN system 1-2 uses the first link or when the wireless LAN system 1-3 uses the second link, it is necessary to separately perform fair access control on each of these links.

(Configuration of Buffer)

Figure 4:
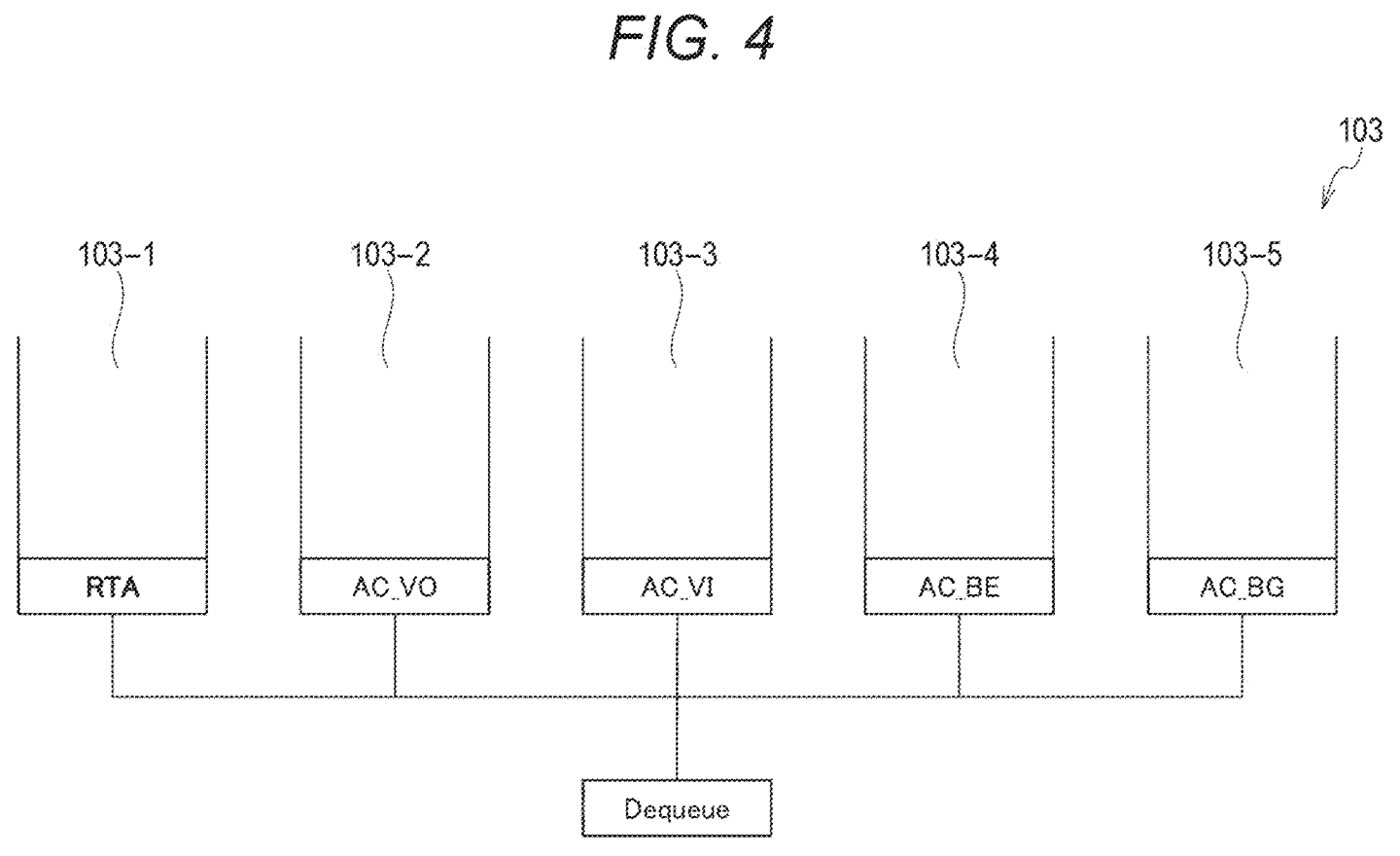

FIG. 4 illustrates a configuration using a transmission buffer for data requiring low latency by the real time application.

As illustrated in FIG. 4, in the communication device 10, a transmission buffer 103 is configured for each access category in order to perform the predetermined EDCA control defined by the IEEE 802.11 system. By performing classification using this access category, data is sequentially stored in the corresponding buffer according to the type of the data, and transmission control is performed according to the priority of the data.

In the conventional EDCA control, data is classified into four access categories of AC_VO (Voice), AC_VI (Video), AC_BE (Best effort), and AC_BG (Background).

AC_VO represents a type corresponding to data requiring low delay and bandwidth guarantee, such as voice data. AC_VI represents a type corresponding to data requiring bandwidth guarantee, such as video data. AC_BE represents a type corresponding to normal data (best effort data). AC_BG represents a type corresponding to large-capacity data (background data) not limited by time.

In FIG. 4, in the transmission buffer 103, the voice data is stored in the AC_VO buffer 103-2 corresponding to AC_VO, the video data is stored in the AC_VI buffer 103-3 corresponding to AC_VI, the best effort data is stored in the AC_BE buffer 103-4 corresponding to AC_BE, and the background data is stored in the AC_BG buffer 103-5 corresponding to AC_BG.

Then, it is configured that the transmission is performed in a case where the transmission waiting time and backoff time defined for each access category have elapsed, and the priority order is the order of AC_VO, AC_VI, AC_BE, and AC_BG.

Furthermore, here, in addition to the transmission buffer 103 of the conventional EDCA control, it is configured that data with low latency is stored in a dedicated buffer.

That is, low delay data required to be transmitted with a short latency is given an opportunity to be preferentially transmitted over other data, and thus, for example, can be transmitted with a transmission waiting time shorter than that of the conventional voice data of AC_VO.

In the example of FIG. 4, an RTA buffer 103-1 for storing data (hereinafter, also referred to as RTA data) of a real time application (RTA) is added to the transmission buffer 103. The RTA data is an example of low delay data.

Thus, in a case where the transmission right is acquired by the transmission opportunity, the communication device 10 is configured to take out data from each buffer on the basis of the priority order of the data and transmit the data.

(Example of Data Transmission)

Figure 5:
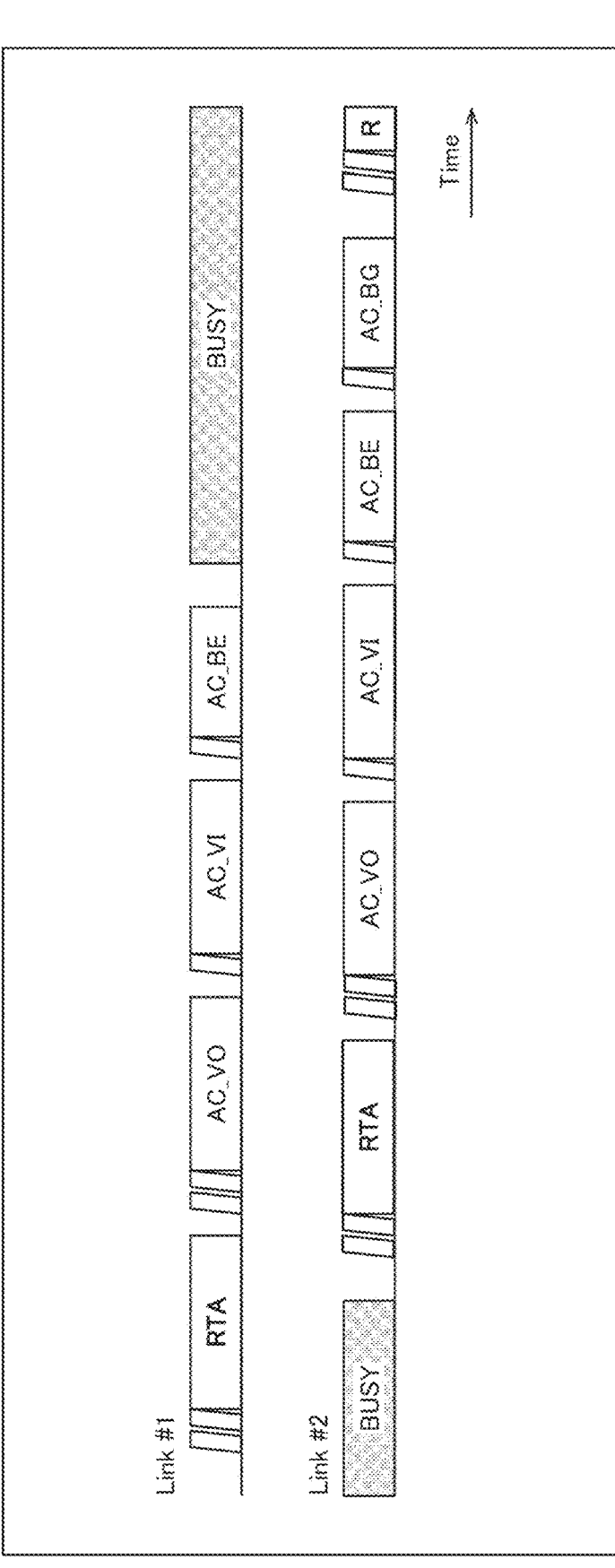
FIG. 5 is a diagram illustrating an example of transmission in a case where data of the real time application is preferentially transmitted.

FIG. 5 illustrates an example of transmission in a case where data of the real time application is preferentially transmitted.

The upper part of FIG. 5 illustrates a flow of data in the first link (Link #1), and the lower part of FIG. 5 illustrates a flow of data in the second link (Link #2). Note that, in FIG. 5, the direction of time is a direction from the left side to the right side in the drawing.

That is, here, in the multi-link configuration described above, in a case where data transmission is performed using the first link and the second link, data is sequentially transmitted in the order of RTA, AC_VO, AC_VI, AC_BE, and AC_BG according to the priority order of the data stored in the transmission buffer 103.

Furthermore, since other wireless LAN systems and other wireless communication systems are operating in each link, a period (BUSY) in which transmission cannot be performed may be set by transmission of these other systems.

Thus, in the first link, as indicated by quadrangles with RTA, AC_VO, AC_VI, and AC_BE in the drawing, the RTA data from the RTA buffer 103-1, the voice data from the AC_VO buffer 103-2, the video data from the AC_VI buffer 103-3, and the best effort data from the AC_BE buffer 103-4 are transmitted in order after a predetermined short waiting time elapses.

Similarly, in the second link, as indicated by quadrangles with RTA, AC_VO, AC_VI, AC_BE, and AC_BG in the drawing, the RTA data, the voice data, the video data, the best effort data, and the background data are transmitted in order after a lapse of a predetermined short waiting time.

In a case of such a configuration, when there is other data other than the data of the real time application, it is necessary to fairly perform the data transmission, and thus there is a problem that the data of the real time application is not easily transmitted.

Figure 6:
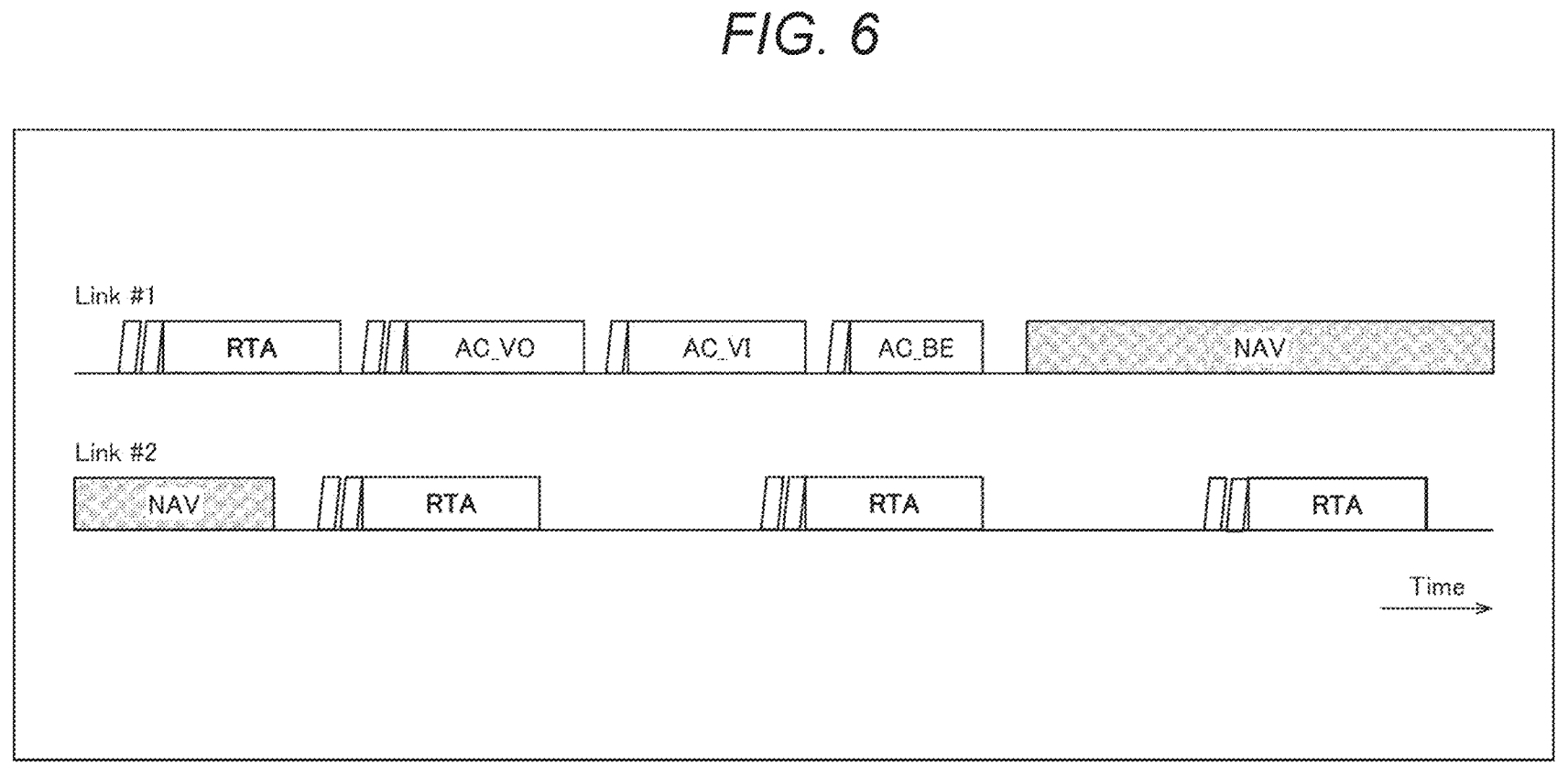

FIG. 6 illustrates a modification example in a case where data of the real time application is preferentially transmitted.

Here, in the multi-link configuration described above, the first link (Link #1) and the second link (Link #2) are used, but in the first link in the upper stage, after a predetermined short waiting time elapses, the RTA data (RTA), the voice data (AC_VO), the video data (AC_VI) data, and the best effort data (AC_BE) are sequentially transmitted.

On the other hand, in the lower second link, the RTA data (RTA) is transmitted at predetermined time intervals. In this case, since only the RTA data is transmitted in the second link, other data cannot be transmitted in a case where there is no RTA data, and as a result, there is a problem that utilization efficiency of the transmission path is reduced.

Note that, in FIG. 6, "NAV" indicates that a period (network allocation vector (NAV)) in which data transmission on the first link or the second link cannot be performed is set by data transmission by another wireless communication system.

(Transmission of RTA Data)

Figure 7:
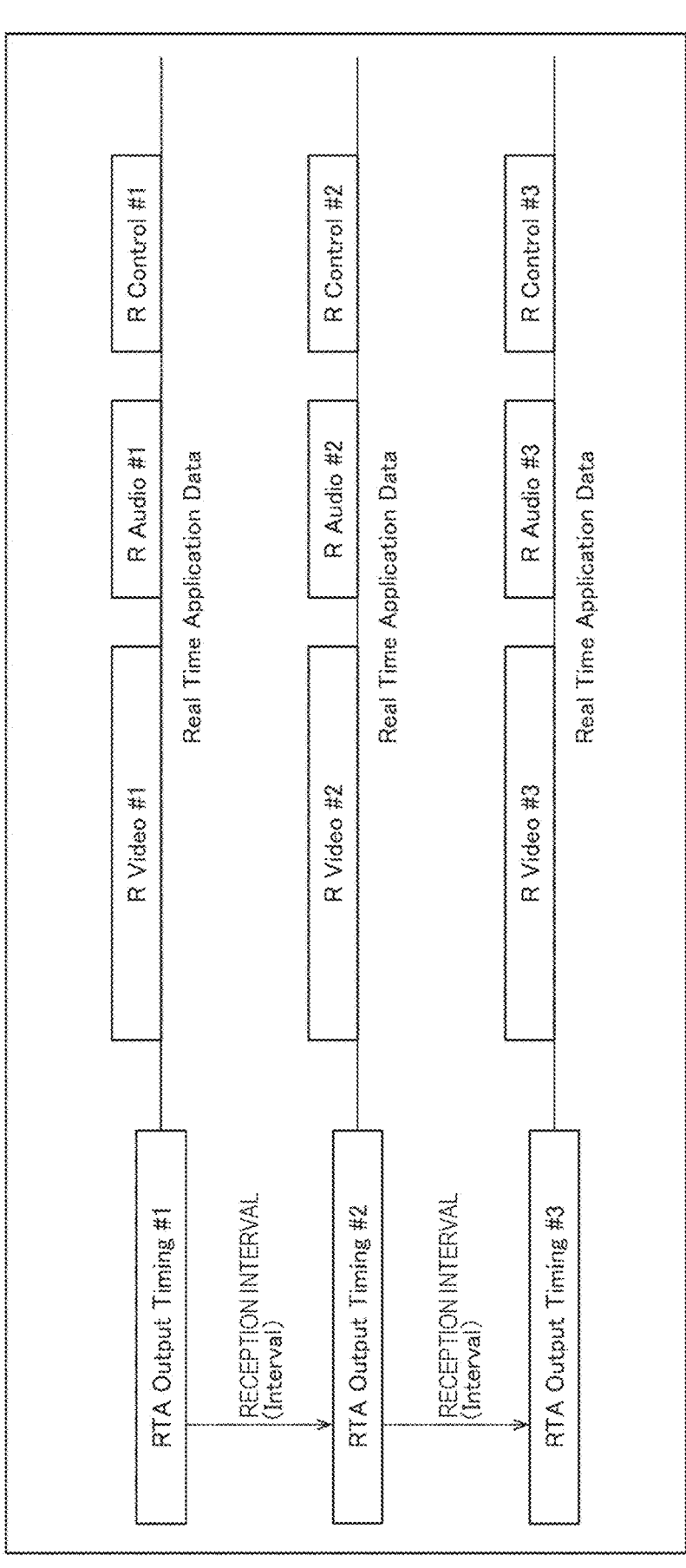
FIG. 7 is a diagram illustrating a flow of processing of specifying a data amount of the real time application.

FIG. 7 illustrates a flow of processing of specifying a data amount of the real time application.

FIG. 7 assumes a case where data of a specific application is received by the transmission side communication device 10Tx, such as a case where arrival of data of the real time application is not determined in advance depending on the application.

That is, the data of the real time application (RTA Data) is output from the application at any reception interval (Interval) and arrives, and there is a high possibility that the timing has periodicity. For example, in FIG. 7, a first arrival timing (RTA Output Timing #1), a second arrival timing (RTA Output Timing #2), and a third arrival timing (RTA Output Timing #3) of the RTA data have an arbitrary reception interval (Interval).

Furthermore, the data of the real time application may include, for example, data such as video data (R Video), voice data (R Audio), and control information data (R Control), and it is configured that all or a part of these pieces of data reaches in a predetermined periphery.

(Outline of Transmission Capacity)

Figure 8:
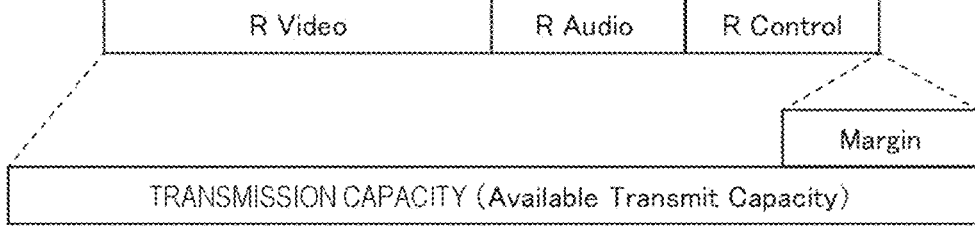
FIG. 8 is a diagram illustrating a flow of processing of estimating a transmission capacity.

FIG. 8 illustrates a flow of a process of estimating a transmission capacity (Available Transmit Capacity).

FIG. 8 illustrates a configuration in which, for example, in a case where there are video data (R Video), voice data (R Audio), and control information data (R Control) as RTA data arriving at each reception interval (Interval), an amount of information obtained by adding a slight margin amount to these pieces of data is calculated as a transmission capacity (Capacity). That is, the transmittable capacity can be calculated by adding a margin amount according to a transmission rate between the communication devices to the amount of information per unit time of data such as video data.

Figure 9:
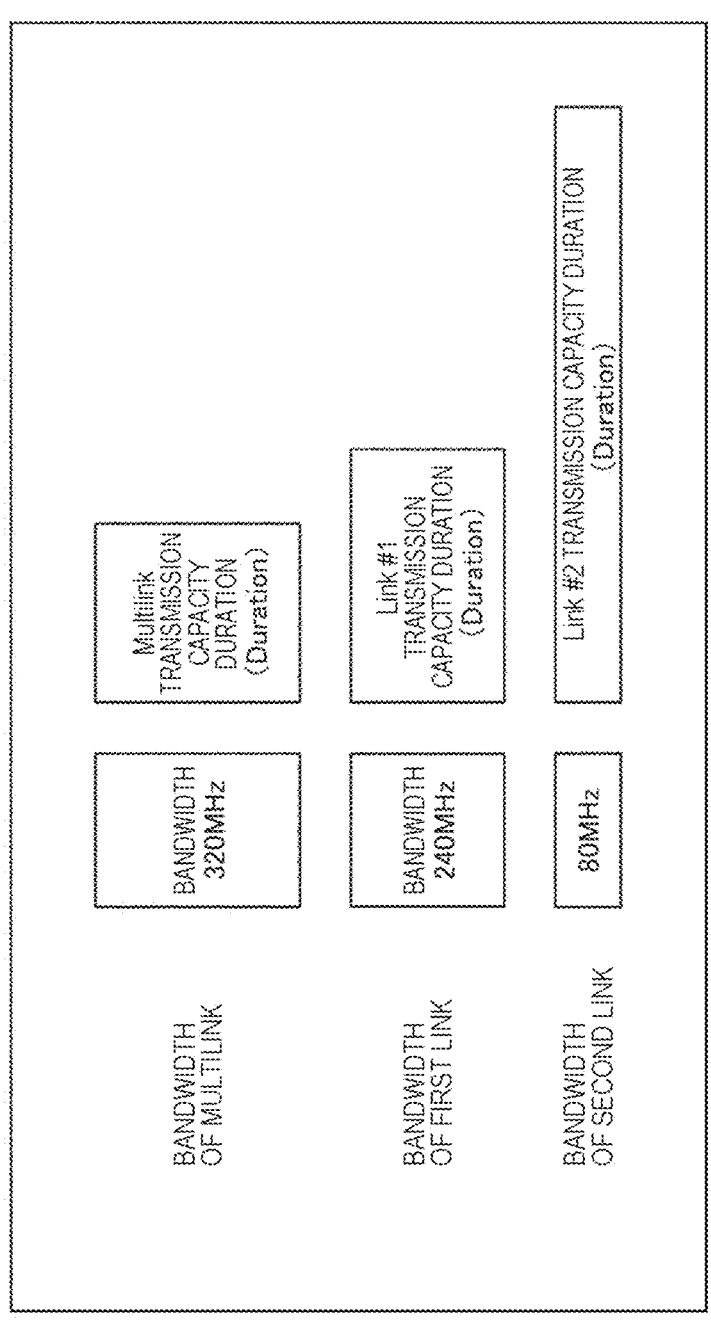
FIG. 9 is a diagram illustrating an example of a configuration for estimating the transmission capacity based on a use bandwidth.

FIG. 9 illustrates an example of a configuration for estimating the transmission capacity (Capacity) based on the use bandwidth.

FIG. 9 illustrates a configuration in which the transmission capacity calculated in FIG. 8 described above is applied to the frequency bandwidth to be used to calculate the transmittable time in one transmission period.

The upper part illustrates a configuration in a case where a plurality of links (frequency bands) is used as the multi-link, in which the transmission capacity obtained by adding bandwidths of all the links is calculated, and for example, when the bandwidth is 320 MHz, a duration of the transmission capacity of the multi-link is calculated.

The middle part illustrates a configuration in a case where only the first link (frequency band) is used, in which the transmission capacity obtained by adding the band of the first link is calculated, and for example, when the bandwidth of the first link is 240 MHz, a duration of the transmission capacity of the first link is calculated.

The lower part illustrates a configuration in a case where only the second link (frequency band) is used, in which the transmission capacity obtained by adding the band of the second link is calculated, and for example, when the bandwidth of the second link is 80 MHz, a duration of the transmission capacity of the second link is calculated.

(Setting of Parameter)

Figure 10:
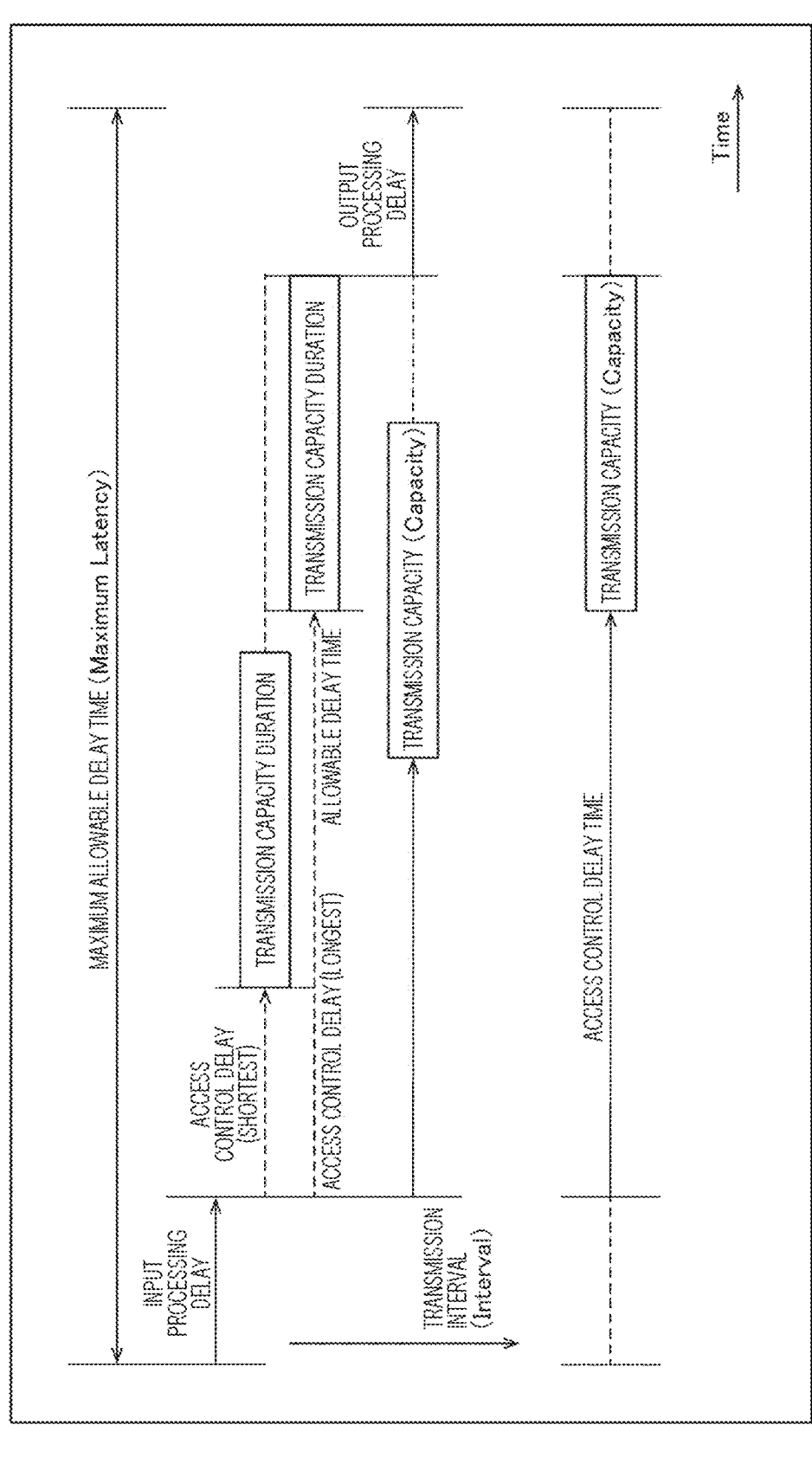
FIG. 10 is a diagram illustrating an example of setting of a transmission parameter.

FIG. 10 illustrates an example of setting of a transmission parameter used for data transmission.

In FIG. 10, the transmission side communication device 10Tx is configured to add a delay time required for input processing and a delay time required for access control every time from a maximum allowable delay time (Maximum Latency) by an application indicated by a time axis in a direction from the left side to the right side in the drawing, and perform data transmission within a range of transmission capacity duration (Duration) in a case of using the link in FIG. 9 described above.

On the other hand, in the reception side communication device 10Rx, since a time required for the output processing is necessary, it is desirable to calculate these times and actually transmit data between a shortest state and a longest state of the transmission capacity duration. Moreover, here, a series of processing on the transmission side and the reception side is considered as a configuration that arrives at each constant transmission interval (Interval).

That is, it is indicated that, in a case where a transmission opportunity is acquired at one transmission interval (Interval), predetermined data transmission corresponding to a period up to the duration of the transmission capacity (Capacity) is performed, and the remaining time can be used for communication of other data.

Note that, for convenience of description, the access control delay illustrated in FIG. 10 is fixedly illustrated, but it can be seen that, in practice, the influence is small even if the delay occurs up to the time corresponding to the allowable delay time according to the acquisition status of the transmission opportunity by the random access control.

Furthermore, in a case where transmission becomes possible beyond the allowable delay time, a next transmission interval (Interval) arrives, and thus it is configured such that an amount of information obtained by adding the transmission capacity (Capacity) to be transmitted at the current transmission interval (Interval) and the next transmission capacity (Capacity) is transmitted at a timing when one transmission opportunity is acquired.

(Example of Access Control)

Figure 11:
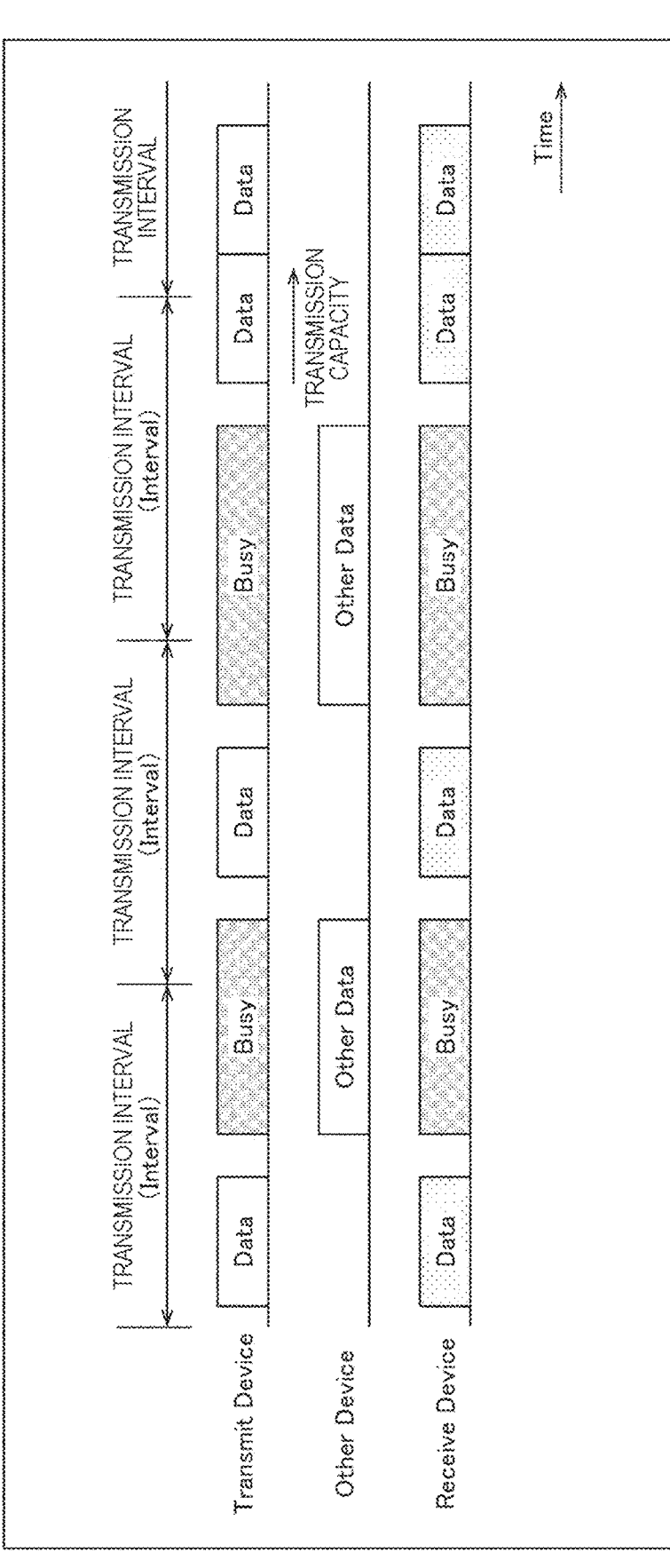
FIG. 11 is a diagram illustrating an example of data in a case where an access control delay occurs.

FIG. 11 illustrates an example of data transmission in a case where an access control delay occurs.

FIG. 11 illustrates a case where, in an environment where the transmission side communication device 10Tx (Transmit Device), another communication device (Other Device), and the reception side communication device 10Rx (Receive Device) are present, in a case where data transmission to which the present technology is applied is performed from the transmission side communication device 10Tx to the reception side communication device 10Rx, the transmission path is used by data transmission of the other communication device and a busy state occurs.

First, when a transmission opportunity is acquired according to predetermined access control in a case where a predetermined transmission interval (Interval) arrives, data transmission ("Data" in the drawing) of a predetermined transmission capacity (Capacity) is performed from the transmission side communication device 10Tx to the reception side communication device 10Rx.

After the data transmission ends, data transmission ("Other Data" in the drawing) from the other communication device is performed, and this is performed by overlapping with at the next transmission interval (Interval). In this case, even when the next transmission interval (Interval) arrives, the transmission side communication device 10Tx is configured to perform the data transmission of the transmission interval (Interval) ("Data" after "Busy" in the drawing) with a delay after the data transmission of the other communication device ends.

After that, data transmission ("Other Data" in the drawing) of the other communication device is performed, and the transmission side communication device 10Tx indicates that it is a case where the remaining time of the transmission interval (Interval) due to the end of the data transmission of the other communication device is shorter than the time required for data transmission of the transmission capacity (Capacity) (arrow indicated by "transmission capacity" in the drawing).

At this time, the data transmission reaching the current transmission capacity (Capacity) overlaps with by the next transmission interval (Interval), and thus the transmission side communication device 10Tx is configured to add the data reaching the transmission capacity (Capacity) of the next transmission interval (Interval) and transmit the data together.

That is, by changing the transmission capacity (Capacity) of the data to be transmitted according to the timing when the transmission opportunity is acquired by the access control in the predetermined transmission interval (Interval), it is possible to obtain a method of repeatedly transmitting the data of the desired transmission capacity (Capacity) at the predetermined transmission interval (Interval) without taking time until the transmission opportunity is acquired more than necessary.

Thus, the transmission side communication device 10Tx is configured to perform data (RTA data or the like) of the specific application such as the real time application in coexistence with data transmission of other communication devices according to a predetermined access control procedure without causing a delay more than necessary.

Figure 12:
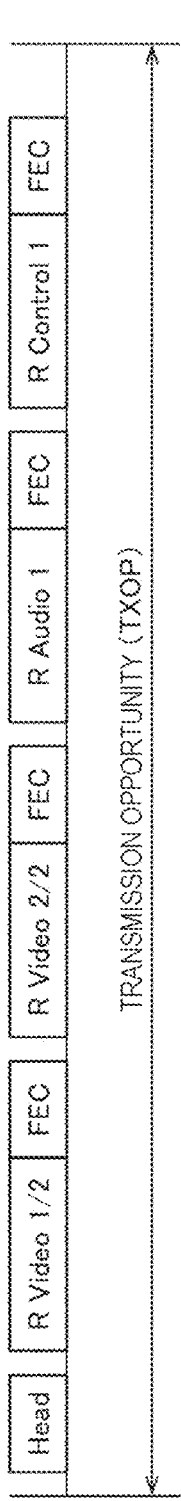
FIG. 12 is a diagram illustrating an example of calculation in a case where the transmission capacity is calculated by applying a forward error correction (FEC) technique.

FIG. 12 illustrates an example of calculation in a case where the transmission capacity (Capacity) is calculated by applying a forward error correction (FEC) technique.

FIG. 12 illustrates an example of calculating one transmission capacity by applying the forward error correction (FEC) technique to data of the real time application.

That is, it is illustrated that the transmission side communication device 10Tx may estimate a minimum necessary transmission opportunity (TXOP) from the total amount of data obtained by adding forward error correction (FEC) information to each of video data (R Video), voice data (R Audio), and control information data (R Control) subsequent to a header portion (Head) providing notification of a predetermined parameter, and the like, and may use this as the transmission capacity.

Figure 13:
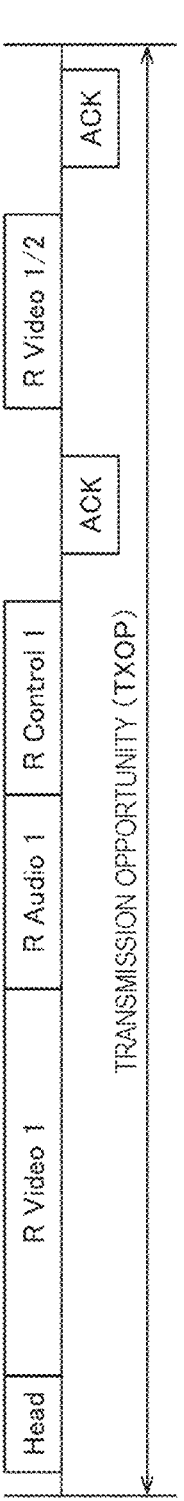
FIG. 13 is a diagram illustrating an example of calculation in a case where the transmission capacity is calculated by applying ACK return and retransmission control technology.

FIG. 13 illustrates an example of calculation in a case where the transmission capacity is calculated by applying ACK return and retransmission control technology according to the state of the transmission path.

FIG. 13 illustrates an example in which one transmission capacity is calculated by applying a technique of returning ACK after data transmission and retransmitting undelivered data to the data of the real time application.

First, in the transmission side communication device 10Tx, the video data (R Video), the voice data (R Audio), and the control information data (R Control) are configured as an aggregated frame to the header (Head) portion providing notification of a predetermined parameter and transmitted therein.

After this data transmission, the transmission side communication device 10Tx is configured to receive a return of a receipt acknowledgment (ACK) from the reception side communication device. Then, for example, when retransmission of information of about half of the video data (R Video) is required, it is configured to perform retransmission of the undelivered data.

That is, an example is illustrated in which the transmission side communication device 10Tx estimates the time required for one data transmission to be completely executed as one transmission opportunity (TXOP) by optimizing and estimating the ACK return and the retransmission data.

(Example of Sequence)

FIG. 14 illustrates an example of a sequence of real time application communication.

FIG. 14 illustrates an example in which the transmission side communication device 10Tx (Transmit Device) sets various transmission parameters in a case where the application is activated by a transmission source application (Source Application), or the like. This example illustrates an example in which the processing of setting a communication parameter of the real time application is performed by the transmission source application on the transmission side.

In the transmission source application, in a case where an application that distributes specific content is activated, or the like, a communication parameter of the real time application is acquired (Application Parameter Setup), and a request command (Application Parameter) for a series of real time application communication is transmitted to the transmission side communication device 10Tx (S12).

In the transmission side communication device 10Tx, for example, in a case of operating as an access point, a predetermined beacon signal is transmitted at a predetermined transmission timing (S11), but here, an information element indicating a state in which the real time application is not set is included.

The transmission side communication device 10Tx that has received the request command (Application Parameter) from the transmission source application sets an identifier that identifies data (RTA data) of the real time application, specifies the reception side communication device 10Rx (Receive Device), and transmits the request command (RTA Request) (S13).

In the reception side communication device 10Rx that has received the request command (RTA Request), the start command (Application Start) is delivered to the destination application (S14), and parameters of buffer capacity and processing capability of the reception side communication device 10Rx are described in the start command (RTA Start) and returned (S15).

The transmission side communication device 10Tx that has received the start command (RTA Start) calculates the above-described transmission interval (Interval) and transmission capacity (Capacity) as transmission parameters of the real time application on the basis of the information described in the start command (RTA Start), and further secures a dedicated buffer space (for example, the RTA buffer 103-1) as necessary (Set Real Time Operation).

Note that, when the transmission interval (Interval) is calculated, a predetermined transmission interval is determined by estimating a predetermined time interval from when the transmission side communication device 10Tx receives the RTA data from the real time application. Furthermore, when in calculating the transmission capacity (Capacity), in a case where the transmission opportunity is acquired in any bandwidth of the use bandwidth, it is only required to determine a predetermined transmission capacity according to the available bandwidth at that time.

In addition, for example, in a case of operating as the access point, the transmission side communication device 10Tx may be configured to construct an information element indicating that the parameters of the RTA have been set, and transmit the beacon signal at a predetermined transmission timing (S16). A notification of these RTA parameters can be given by transmitting a beacon signal including this information element to another communication device existing in the surroundings.

Then, in a case where the content data arrives from the transmission source application at a predetermined cycle, the transmission side communication device 10Tx stores the content data in a dedicated buffer as necessary, and transmits the content data as RTA data (RTA Data) of a predetermined transmission capacity at a predetermined transmission interval (S17 and S18).

Here, the reception side communication device 10Rx receives the transmitted RTA data (data to which the identifier is set), stores the RTA data in a dedicated buffer (for example, the RTA reception buffer 115-1), and outputs the content data to the destination application (S19).

As described above, in a case where the received data is the RTA data, the received data is stored in a dedicated buffer that preferentially outputs the RTA data, and is output to the destination application according to the output format of the RTA data. At this time, the RTA data is output to the destination application before the maximum allowable delay time elapses.

Furthermore, the reception side communication device 10Rx outputs the RTA data to the destination application, and returns ACK information as necessary (S20). Note that, in a case where the RTA data cannot be correctly decoded, it is configured to return NACK information requesting retransmission. Here, since it is necessary to output the RTA data to the destination application before the maximum allowable delay time elapses, the ACK information or the NACK information is constructed on the basis of the maximum allowable delay time.

Furthermore, in the transmission side communication device 10Tx that has received the receipt acknowledgment (ACK/NACK) information, in a case where the NACK information is returned, retransmission may be performed as necessary from the allowable delay time according to the present technology, and in a case where the NACK information is the ACK information, the transmission of the RTA data at the transmission interval ends.

Then, it is configured such that transmission of another communication device and other data is performed until the next transmission interval arrives, and in a case where the next transmission interval arrives, the series of transmission of the RTA data is repeatedly performed (S21 to S24, S25 to S28, and S29 to S32).

On the other hand, in a case where it is determined in the transmission source application that these specific applications have ended, a release command (Application End) of the real time application is sent to the transmission side communication device 10Tx in order to reset the RTA transmission (S33).

Upon receiving this notification, the transmission side communication device 10Tx releases (cancels) the identifier that identifies data (RTA data) of the real time application, cancels the setting of the dedicated buffer space, and transmits a release command (RTA Release) to the reception side communication device 10Rx (S34).

At the same time, for example, in a case of operating as the access point, the transmission side communication device 10Tx may be configured to cancel the setting of existing RTA information element and transmit the beacon signal at a predetermined transmission timing in order to indicate that the parameters of the RTA are released (S36).

Furthermore, in the reception side communication device 10Rx that has received the release command (RTA Release), the end command (Application End) is delivered to the destination application (S35) to provide notification of the end of the series of communication. Note that, also in the reception side communication device 10Rx, upon receiving the release command (RTA Release), the identifier that identifies the RTA data may be released (canceled), and the setting of the dedicated buffer space may be canceled.

Figure 15:
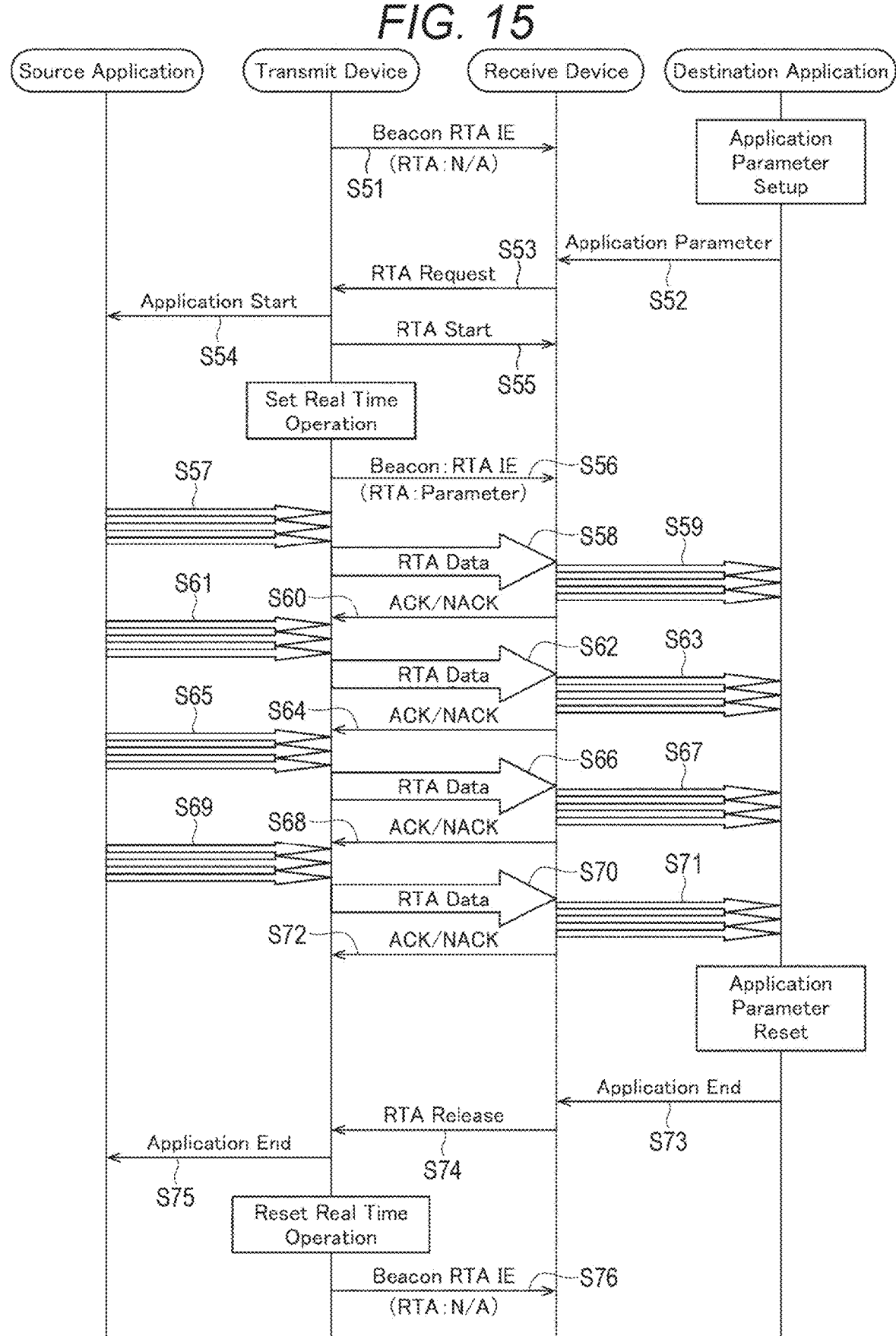
FIG. 15 is a diagram illustrating a modification example of the sequence of the real time application communication.

FIG. 15 illustrates another example of the sequence of the real time application communication.

FIG. 15 illustrates an example in which the transmission side communication device 10Tx (Transmit Device) is specified, and the transmission side communication device 10Tx sets various transmission parameters in a case where the application is activated by the destination application, or the like. In this example, first, an example is illustrated in which the processing of setting the communication parameter of the real time application is performed by the destination application on the reception side.

In the destination application, the communication parameter of the real time application is acquired (Application Parameter Setup) in a case where an application that delivers specific content is activated, or the like, and a request command (Application Parameter) of a series of the real time application is transmitted to the reception side communication device 10Rx (Receive Device) (S52).

Note that the transmission side communication device 10Tx transmits a predetermined beacon signal at a predetermined transmission timing, for example, in a case of operating as the access point (S51).

The reception side communication device 10Rx that has received this request command (Application Parameter) from the destination application specifies the transmission side communication device 10Tx, sets the identifier that identifies data (RTA data) of the real time application, and transmits a request command (RTA Request) including parameters of the buffer capacity and the processing capability of the reception side communication device 10Rx to the transmission side communication device 10Tx (S53).

The transmission side communication device 10Tx that has received the request command (RTA Request) delivers the start command (Application Start) to the transmission source application (S54), calculates the transmission interval and the transmission capacity described above as the transmission parameters of the real time application together, and further secures a dedicated buffer space (for example, the RTA buffer 103-1) as necessary (Set Real Time Operation).

In addition, for example, in a case of operating as the access point, the transmission side communication device 10Tx may be configured to construct an information element indicating that the parameters of the RTA have been set, and transmit the beacon signal at a predetermined transmission timing (S56). A notification of these RTA parameters can be given by transmitting a beacon signal including this information element to another communication device existing in the surroundings.

Then, in a case where the content data arrives from the transmission source application at a predetermined cycle, the transmission side communication device 10Tx is configured to store the content data in a dedicated buffer as necessary, and transmit the content data as RTA data (RTA Data) of a predetermined transmission capacity at a predetermined transmission interval. Operation of transmission of the RTA data here is similar to that in FIG. 14 described above, and thus the detailed description thereof will be omitted (S57 to S60, S61 to S64, S65 to S68, and S69 to S72).

On the other hand, in the destination application, in a case where it is determined that these applications have ended, the release command (Application End) of the real time application is sent to the reception side communication device 10Rx in order to reset the RTA transmission (S73).

Upon receiving this notification, the reception side communication device 10Rx releases the identifier that identifies data (RTA data) of the real time application, and transmits the release command (RTA Release) to the transmission side communication device 10Tx (S74).

In the transmission side communication device 10Tx that has received the release command (RTA Release), the setting of the dedicated buffer space is canceled, the end command (Application End) is delivered to the transmission source application (S75), and notification of the end of the series of communication is provided.

At the same time, for example, in a case of operating as the access point, the transmission side communication device 10Tx may be configured to cancel the setting of the existing RTA information element and transmit the beacon signal at a predetermined transmission timing in order to indicate that the parameters of the RTA are released (S76).

<Configuration of Communication Device>

Figure 16:
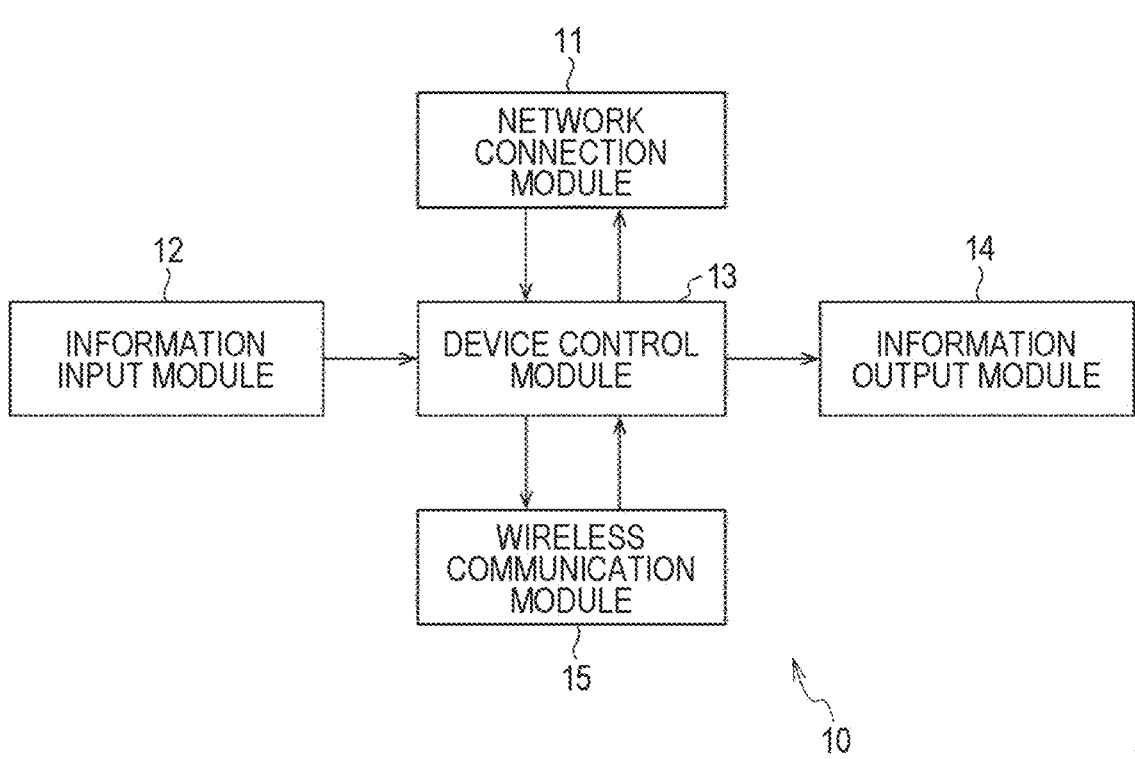
FIG. 16 is a block diagram illustrating an example of a configuration of a communication device to which the present technology is applied.

FIG. 16 illustrates an example of a configuration of a communication device to which the present technology is applied.

The communication device 10 illustrated in FIG. 16 is a wireless communication device configured as the access point AP10 or the communication terminal STA10 in the wireless LAN system 1-1 (FIG. 1), that is, the transmission side communication device 10Tx or the reception side communication device 10Rx.

In FIG. 16, the communication device 10 includes a network connection module 11, an information input module 12, a device control module 13, an information output module 14, and a wireless communication module 15.

The network connection module 11 includes, for example, a circuit having a function of connecting an optical fiber network or another communication line to the Internet network via a service provider as the access point AP10 and a peripheral circuit thereof, a microcontroller, a semiconductor memory, and the like.

The network connection module 11 performs various processes related to the Internet connection under control of the device control module 13. For example, in a case where the communication device 10 operates as the access point AP10, the network connection module 11 has a configuration in which a function such as a communication modem for connecting to the Internet network is mounted.

The information input module 12 includes, for example, an input device such as a push button, a keyboard, or a touch panel. The information input module 12 has a function of inputting instruction information corresponding to an instruction from the user to the device control module 13.

The device control module 13 includes, for example, a microprocessor, a microcontroller, a semiconductor memory, and the like. The device control module 13 controls each unit (module) in order to operate the communication device 10 as the access point AP10 or the communication terminal STA10.

The device control module 13 performs various processes on information supplied from the network connection module 11, the information input module 12, or the wireless communication module 15. Furthermore, the device control module 13 supplies information obtained as a result of its own processing to the network connection module 11, the information output module 14, or the wireless communication module 15.

For example, the device control module 13 supplies transmission data passed from an application or the like of a protocol upper layer to the wireless communication module 15 at the time of data transmission, and passes received data supplied from the wireless communication module 15 to the application or the like of the protocol upper layer at the time of data reception.

The information output module 14 includes, for example, a display element such as a liquid crystal display, an organic EL display, or a light emitting diode (LED) display, or an output device including a speaker that outputs sound or music.

The information output module 14 has a function of displaying necessary information to the user on the basis of the information supplied from the device control module 13. Here, the information processed by the information output module 14 includes, for example, an operation state of the communication device 10, information obtained via the Internet network, and the like.

The wireless communication module 15 includes, for example, a wireless chip, a peripheral circuit, a microcontroller, a semiconductor memory, and the like. The wireless communication module 15 performs various processes related to wireless communication under the control of the device control module 13. Details of the configuration of the wireless communication module 15 will be described later with reference to FIG. 17.

Note that, here, a wireless communication module on which a wireless communication chip, a peripheral circuit, and the like are mounted will be described as an example, but the present technology is not limited to the wireless communication module, and can be applied to, for example, a wireless communication chip, a wireless communication LSI, and the like. Moreover, in the wireless communication module, whether to include an antenna is optional.

Furthermore, in the communication device 10 of FIG. 16, the device control module 13 and the wireless communication module 15 are necessary components, but whether the network connection module 11, the information input module 12, and the information output module 14 excluding them are included in the components is optional.

That is, each of the communication devices 10 operating as the access point AP10 or the communication terminal STA10 can be configured with only necessary modules, and unnecessary portions can be simplified or not incorporated.

More specifically, for example, the network connection module 11 can be incorporated only in the access point AP10, and the information input module 12 and the information output module 14 can be incorporated only in the communication terminal STA10.

Figure 17:
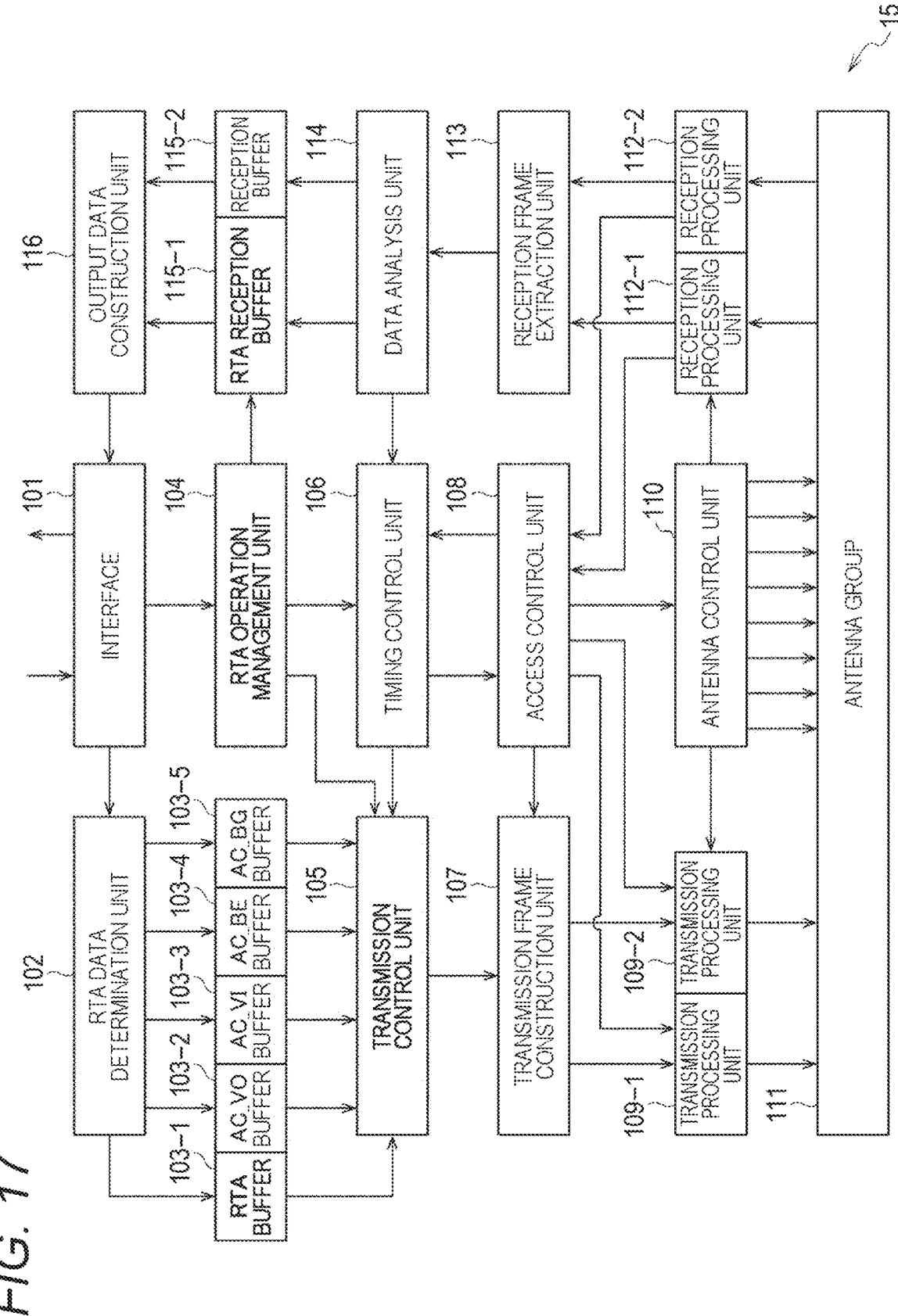
FIG. 17 is a block diagram illustrating an example of a configuration of a wireless communication module in FIG. 16.

FIG. 17 illustrates an example of a configuration of the wireless communication module 15 of FIG. 16.

The wireless communication module 15 includes an interface 101 that is connected to other modules and exchanges various types of information and data, an RTA data determination unit 102 that determines an attribute of transmission data from an access category, and a transmission buffer 103 that temporarily stores transmission data for each category.

The transmission buffer 103 is a buffer group including an RTA buffer 103-1 that stores RTA data for real time applications, an AC_VO buffer 103-2 that stores voice data, an AC_VI buffer 103-3 that stores video data, an AC_BE buffer 103-4 that stores best effort data, and an AC_BG buffer 103-5 that stores background data.

This configuration includes an RTA operation management unit 104 that controls transmission-reception operation for real time applications, which is a characteristic configuration of the present technology, a transmission control unit 105 that dequeues the order of transmission data, a timing control unit 106 that controls the transmission timing, a transmission frame construction unit 107 that constructs a data frame to be transmitted, an access control unit 108 that controls transmission and reception of data, and transmission processing units 109-1 and 109-2 that perform transmission operation in each link.

The transmission processing unit 109-1 performs a transmission operation related to the first link (Link #1). The transmission processing unit 109-2 performs a transmission operation related to the second link (Link #2). Furthermore, there is provided an antenna control unit 110 that performs control to transmit a transmission signal from an antenna group 111 to another communication device 10 and receive a transmission signal transmitted from another communication device 10 via the antenna group 111. Note that the antenna control unit 110 and the antenna group 111 may not be included in the wireless communication module 15.

On the other hand, the wireless communication module 15 includes reception processing units 112-1 and 112-2 that perform a reception operation using a reception signal received by the antenna as a predetermined signal in each link. The reception processing unit 111-1 performs a reception operation related to the first link (Link #1). The reception processing unit 111-2 performs a reception operation related to the second link (Link #2).

Furthermore, a reception frame extraction unit 113 that extracts a predetermined data frame from the received signal, a data analysis unit 114 that analyzes data included in the received data frame, and a reception buffer 115 that temporarily stores the received data are included.

The reception buffer 115 is a buffer group including a reception buffer 115-2 that stores data excluding RTA data, and an RTA reception buffer 115-1 as a dedicated buffer space for storing RTA data for real time applications.

Moreover, an output data construction unit 116 that constructs data in an output format in order to deliver data to a predetermined application is included, and the data is finally delivered to an application or the like of a connected device via the interface 101.

Note that, in the configuration illustrated in FIG. 17, an arrow between each block represents a flow and control of data (signal), and each block operates in cooperation with another block connected by the arrow in order to implement its own function.

That is, for example, the RTA operation management unit 104 operates in cooperation with each of the interface 101, the transmission control unit 105, the timing control unit 106, and the reception buffer 115 in order to implement a function related to control of transmission of RTA data for real time applications as a characteristic function of the present technology.

Furthermore, for example, the access control unit 108 operates in cooperation with each of the timing control unit 106, the transmission frame construction unit 107, the transmission processing units 109-1 and 109-2, the antenna control unit 110, and the reception processing units 112-1 and 112-2 in order to implement functions related to data transmission and reception control as characteristic functions of the present technology.

In the wireless communication module 15 configured as described above, in particular, the RTA operation management unit 104 and the access control unit 108 control the operation of each unit, thereby performing, for example, processing as follows.

That is, in the wireless communication module 15 of the communication device 10 (the transmission side communication device 10Tx), the RTA operation management unit 104, the access control unit 108, and the like perform control to estimate a transmission capacity (Capacity) to repeatedly transmit data (for example, RTA data) having a specific attribute with a predetermined amount of information for each predetermined transmission interval (Interval), and determine a predetermined transmission capacity (Capacity) to be transmitted according to an elapsed time of the predetermined transmission interval (Interval) and transmit the data (for example, RTA data) having the specific attribute in a case where a transmission opportunity is acquired by random access control with another communication device (the reception side communication device 10Rx).

Furthermore, in the wireless communication module 15 of the communication device 10 (the reception side communication device 10Rx), the RTA operation management unit 104, the access control unit 108, and the like perform control to set reception of data having a specific attribute (for example, RTA data) by specifying the transmission side communication device (the transmission side communication device 10Tx) and the reception side communication device (the reception side communication device 10Rx) of data and exchanging communication parameters, and periodically receive data having a specific attribute (for example, RTA data) having a predetermined transmission capacity (Capacity) for each predetermined transmission interval (Interval).

(Configuration of Command)

FIG. 18 illustrates an example of a configuration of a command related to setup of the real time application.

These commands are used to provide notification of parameter information as respective commands of a request command (RTA Request), a start command (RTA Start), a release command (RTA Release), and an end command (RTA End).

Note that since these commands are transmitted by wireless communication, the configuration conforming to a frame format used in the wireless LAN system is illustrated in the example of the configuration illustrated in FIG. 18, but the commands may not be limited to this configuration.

This frame includes, as predetermined header information, Frame Control indicating the type of frame, Duration indicating the duration, Transmit Address indicating an address on the transmission side, and Receive Address indicating an address on the reception side. Moreover, this frame includes a real time application parameter set (Real Time Application Parameter Set) necessary for implementing control to which the present technology is applied, and is configured by adding a frame check sequence (FCS) to the end.

The real time application parameter set includes information such as Type indicating a command format, Source Address indicating a source address of a transmission source, Destination Address indicating a destination address of a destination, RTA ID indicating an identifier of RTA, Group ID indicating a group, Application indicating a type of application, Delay indicating an allowable delay time, Buffer Size indicating a buffer size, Band-Width indicating information of a bandwidth to be used, Traffic Rate indicating a transmission rate assumed for traffic, Max Latency indicating a maximum delay time, and Delayed Output indicating a data output at the time of occurrence of a delay.

Note that these pieces of information are configured such that necessary portions are described in each command and transmitted from the transmission side, and the information is used on the reception side. Furthermore, the configuration example of the real time application parameter set illustrated in FIG. 18 is merely an example, and for example, as long as information such as information regarding a maximum allowable delay of data, information regarding a buffer capacity, information regarding a use bandwidth, and information regarding an output format of data as illustrated in FIG. 18 is included as parameters, other parameters (for example, parameters corresponding to the information illustrated in FIG. 19, or the like) may be included.

(Configuration of Parameters of Application)

FIG. 19 illustrates an example of a configuration of parameters of an application.

The parameters of the application are parameters exchanged between an application device and the communication device 10. The application device is a device in which a specific application such as the real time application is mounted.

In the example of FIG. 19, a configuration conforming to a frame format used in a wireless LAN system is illustrated, and Frame Control indicating a type of a frame, Duration indicating duration, Transmit Address indicating an address on a transmission side, and Receive Address indicating an address on a reception side are described as predetermined header information, but parameters may be added or deleted as necessary. The parameter to be actually exchanged is described as an application parameter information (Application Parameter Information), and an FCS is further added.

This parameters are configured such that parameters corresponding to each application are described in Type indicating each of notification of an application parameter (Application Parameter), start of an application (Application Start), end of an application (Application End), or the like, Source Address indicating an address on a sending source side, and Destination Address indicating an address on a sending destination side.

The parameters according to the application include, for example, Application Type indicating an application format in a case of moving image information, Frame Size indicating a frame size of data, Frame Rate indicating a frame rate, Max Latency indicating a maximum delay time, Buffer Size indicating a size of a buffer, Output Type indicating a format for outputting data, Output Delay indicating an output delay time, RTA Attribute indicating an attribute of the real time application, and the like.

In the present technology, the communication device 10 that performs transmission and reception of the real time application is configured to calculate a transmission interval (Interval) and a transmission capacity (Capacity) related to RTA data transmitted by wireless communication with reference to these parameters.

That is, the communication device 10 is configured to calculate a maximum allowable delay time from information such as Application Type indicating an application format, Output Type indicating an output format of data, and Output Delay indicating an output delay time, and determine a transmission interval (Interval) and a transmission capacity (Capacity) from information such as Frame Size indicating a frame size and Frame Rate indicating a frame rate in consideration of the input processing delay time and the output processing delay time illustrated in FIG. 10.

Note that the configuration example illustrated in FIG. 19 is merely an example, and these parameters may be estimated using other parameters and the like. For example, as the parameters according to the application, other parameters may be included as long as information such as information regarding the maximum allowable delay of data, information regarding the buffer capacity, and information regarding the output format of data as illustrated in FIG. 19 is included.

(Configuration of Information Element)

FIG. 20 illustrates an example of a configuration of an information element for providing notification of a setting of the real time application.

This information element is included in, for example, a beacon frame or the like for notification, so that it is possible that other communication devices in the surroundings are notified that data transmission related to the real time application is being performed, and notified of parameters such as a transmission interval, a transmission capacity, and a duration.

As a configuration of the information element, various parameters such as an Element ID indicating an identifier of an element, a Length indicating an information length, a Type indicating a format, a Maximum Latency indicating a maximum allowable delay time, an Average Latency indicating an average delay time, an Available Channel indicating an available channel, a Transmit Capacity indicating a transmission capacity, a Transmit Interval indicating a transmission interval, and a Maximum Duration indicating a maximum duration are described.

Note that Num of RTA IDs indicating the number of RTA IDs and RTA ID as an identifier thereof are described so that a plurality of RTA IDs can be set.

(Configuration of Frame)

Figure 21:
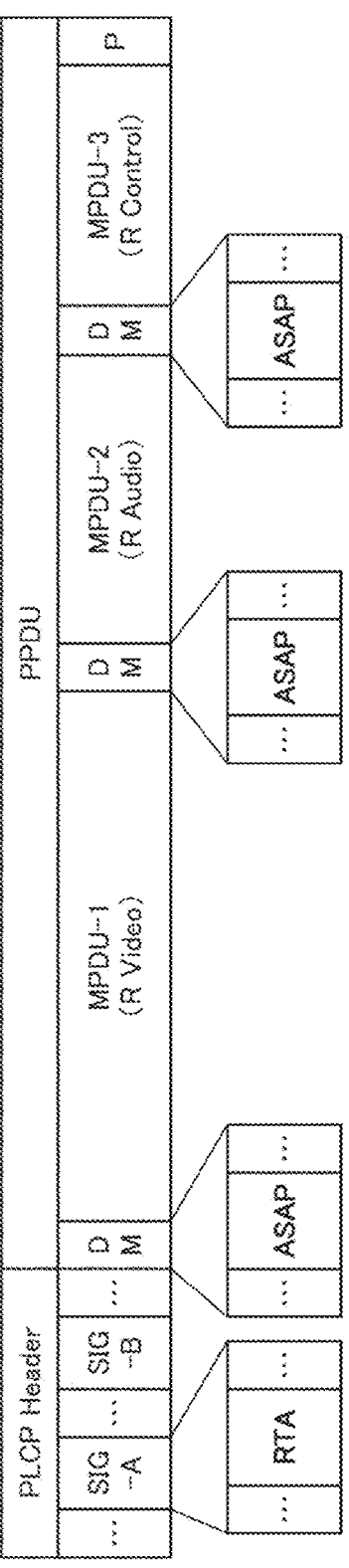
FIG. 21 is a diagram illustrating an example of a frame configuration of real time application data.

FIG. 21 illustrates an example of a frame configuration of real time application data.

By storing an identifier or a flag that identifies data (RTA data) of the real time application in a header portion of the data, this data frame configuration is used to easily store data in a buffer (for example, the RTA reception buffer 115-1) that performs priority processing in the reception side communication device 10Rx.

For example, the configuration illustrated in FIG. 21 illustrates a configuration in which a flag that identifies the RTA ID or the RTA data is prepared in a SIG-A field of the Physical Layer Convergence Protocol (PLCP) header. Moreover, in the configuration illustrated in FIG. 21, a flag (ASAP) indicating that the data of the MPDU is quickly processed may be set using a vacant bit of a delimiter (DM) added before a MAC protocol data unit (MPDU) constituting a PLCP protocol data unit (PPDU).

(Setting and Cancellation of RTA)

Next, a flow of processing of setting and canceling the real time application will be described with reference to flowcharts of FIGS. 22 and 23.

In step S101, the RTA operation management unit 104 determines whether the application that executes the RTA communication is activated and the RTA communication is activated, and in a case where it is determined that the application that executes the RTA communication is activated ("YES" in S101), the processing proceeds to step S102. In step S102, the RTA operation management unit 104 acquires parameters (for example, the parameters illustrated in FIG. 19) of the activated application.

In step S103, the RTA operation management unit 104 determines whether the own device is the transmission side communication device 10Tx, and in a case where it is determined that the own device is the transmission side communication device 10Tx ("YES" in S103), the processing proceeds to step S104. In step S104, the RTA operation management unit 104 specifies the reception side communication device 10Rx and transmits an RTA Request command.

In step S105, the RTA operation management unit 104 determines whether an RTA Start command has been received from the reception side communication device 10Rx, and in a case where it is determined that the RTA Start command has been received ("YES" in S105), the processing proceeds to step S106, and the RTA operation management unit 104 executes the processing of steps S106 and S107.

That is, in a case where it is the transmission side communication device 10Tx ("YES" in S103) and in a case where the RTA Start command (for example, the parameter information included in the command illustrated in FIG. 18) is received from the reception side communication device 10Rx, an operation time of the real time application is calculated (S106), and these parameters of the RTA are set (S107). Note that, in a case where the RTA Start command has not been received until a predetermined time ("NO" in S105), the parameters may be reset and the RTA Request command may be retransmitted.

In step S108, the RTA operation management unit 104 determines whether the communication device is the transmission side communication device 10Tx of the RTA data, and in a case where it is determined that the communication device is the transmission side communication device 10Tx of the RTA data ("YES" in S108), the processing proceeds to step S109. In step S109, the RTA operation management unit 104 sets the identifier of the RTA ID and the dedicated transmission buffer 103 (RTA buffer 103-1) as necessary.

In step S110, the RTA operation management unit 104 determines whether the own device is in operation as an access point, and in a case where it is determined that the own device is in operation as an access point ("YES" in S110), the processing proceeds to step S111. In step S111, the RTA operation management unit 104 sets the RTA IE describing these parameters, adds the RTA IE to the beacon frame, and transmits the beacon frame.

Note that, in a case where the processing of step S111 ends or it is determined in the determination processing of step S110 that the access point does not operate, the processing returns to step S101, and the subsequent processes are repeated.

Figure 23:
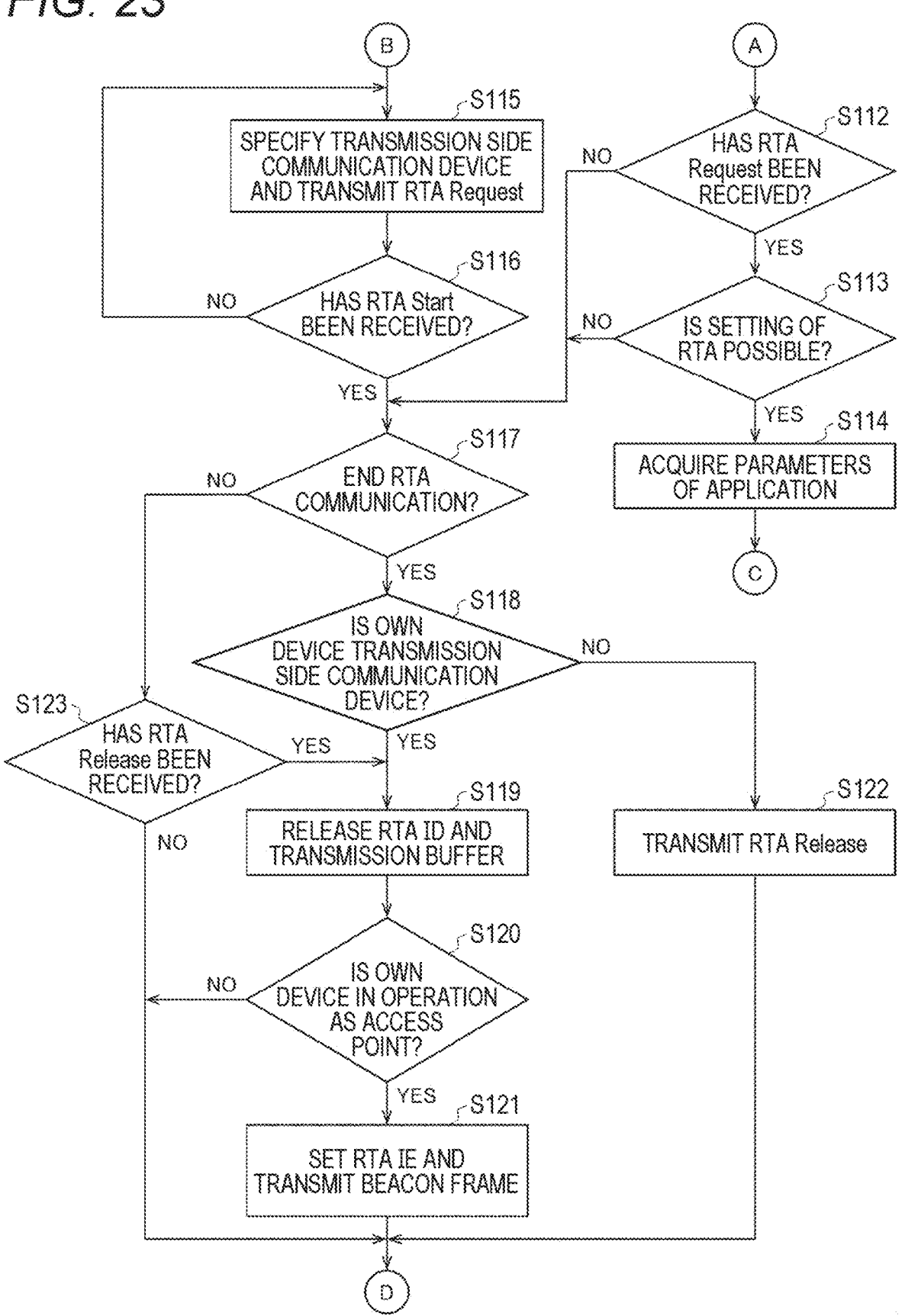
FIG. 23 is a flowchart describing a flow of the processing of setting and canceling the real time application.

On the other hand, in a case where it is determined in the determination processing of step S101 that the RTA communication is not activated, the processing proceeds to step S112 of FIG. 23.

In step S112, the RTA operation management unit 104 determines whether an RTA request command has been received from the reception side communication device 10Rx, and in a case where it is determined that the RTA request command has been received ("YES" in S112), the processing proceeds to step S113, and the RTA operation management unit 104 executes the processing of steps S113 and S114.

That is, even if the RTA communication is not activated ("NO" in S101), in a case where the transmission side communication device 10Tx receives the RTA request command from the reception side communication device 10Rx ("YES" in S112), if setting of the RTA is possible with reference to the request parameter ("YES" in S113), parameters (for example, the parameters illustrated in FIG. 19) of the corresponding application are acquired (S114). Then, the processing proceeds to step S106 in FIG. 22 described above, and the parameter of the RTA is set.

Furthermore, in a case where it is determined in the determination processing of step S103 that the own device is the reception side communication device 10Rx ("NO" in S103), the processing proceeds to step S115 of FIG. 23. In step S115, the RTA operation management unit 104 specifies the transmission side communication device 10Tx and transmits the RTA Request command.

Subsequently, in step S116, the RTA operation management unit 104 determines whether the RTA Start command has been received from the transmission side communication device 10Tx, and in a case where it is determined that the RTA Start command has been received ("YES" in S116), the processing proceeds to step S117, and the processing of and after step S117 is executed by the RTA operation management unit 104. Note that, in a case where it is determined that the RTA Start command has not been received until a predetermined time ("NO" in S116), the parameters may be reset and the RTA Request command may be retransmitted.

Furthermore, in a case where it is determined in the determination processing of step S112 that the RTA request command has not been received ("NO" in S112), or in a case where it is determined in the determination processing of step S113 that the RTA cannot be set ("NO" in S113), the processing proceeds to step S117.

That is, in a case where the application that executes the RTA communication is terminated and the RTA communication is terminated ("YES" in S117), and the own device is the transmission side communication device 10Tx ("YES" in S118), the identifier of the set RTA ID and the dedicated transmission buffer 103 (RTA buffer 103-1) are canceled as necessary (S119). Furthermore, in a case where the own device is in operation as an access point ("YES" in S120), the RTA IE describing that these parameters are released is set, added to the beacon frame, and transmitted (S121).

On the other hand, in a case where the own device is the reception side communication device 10Rx ("NO" in S118), an RTA Release command is transmitted to the transmission side communication device 10Tx (S122). Furthermore, in a case where it is determined in the determination processing of step S117 that the RTA communication is not terminated ("NO" in S117) and an RTA Release command is received ("YES" in S123), it means that the RTA Release command is received from the reception side communication device 10Rx, and thus the processing proceeds to step S119 and the parameters of the RTA communication are canceled.

Figure 22:
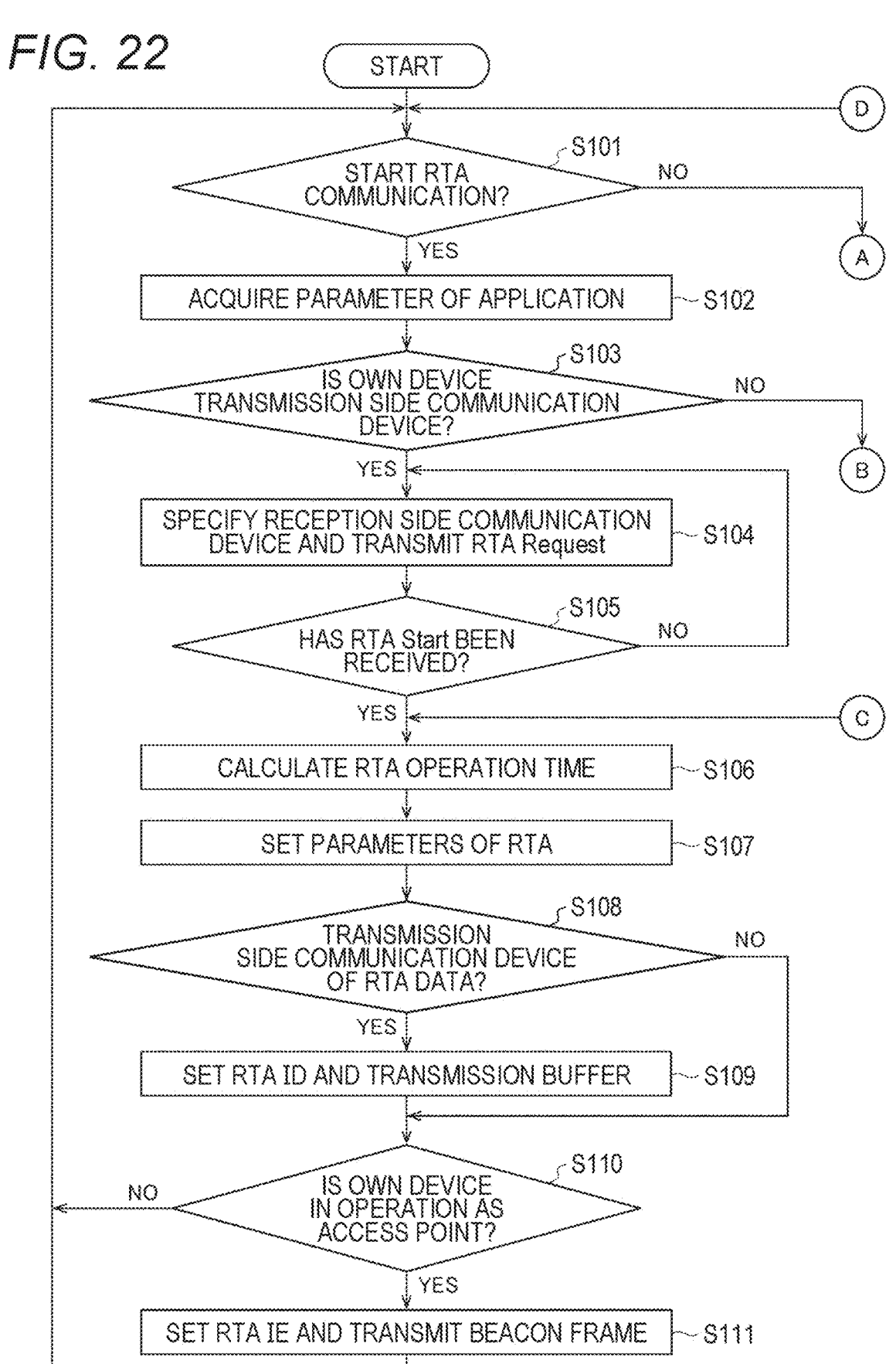
FIG. 22 is a flowchart describing a flow of processing of setting and canceling the real time application.

Upon completion of any of steps S121, S122, and S123 in FIG. 23, the processing returns to step S101 in FIG. 22, and the above-described processing is repeated.

The flow of the processing of setting and canceling the real time application has been described above.

(Details of Transmission Side)

Next, processing of operation of the transmission side communication device 10Tx will be described with reference to flowcharts of FIGS. 24 and 25.

In step S201, the RTA operation management unit 104 acquires the transmission parameter of the real time application, and sets the arrival time of the timing corresponding to the interval according to the transmission interval set as the acquired transmission parameter (S202).

In step S203, the RTA operation management unit 104 determines whether the set transmission interval has arrived, and in a case where it is determined that the transmission interval has arrived ("YES" in S203), the processing proceeds to step S204.

Figure 25:
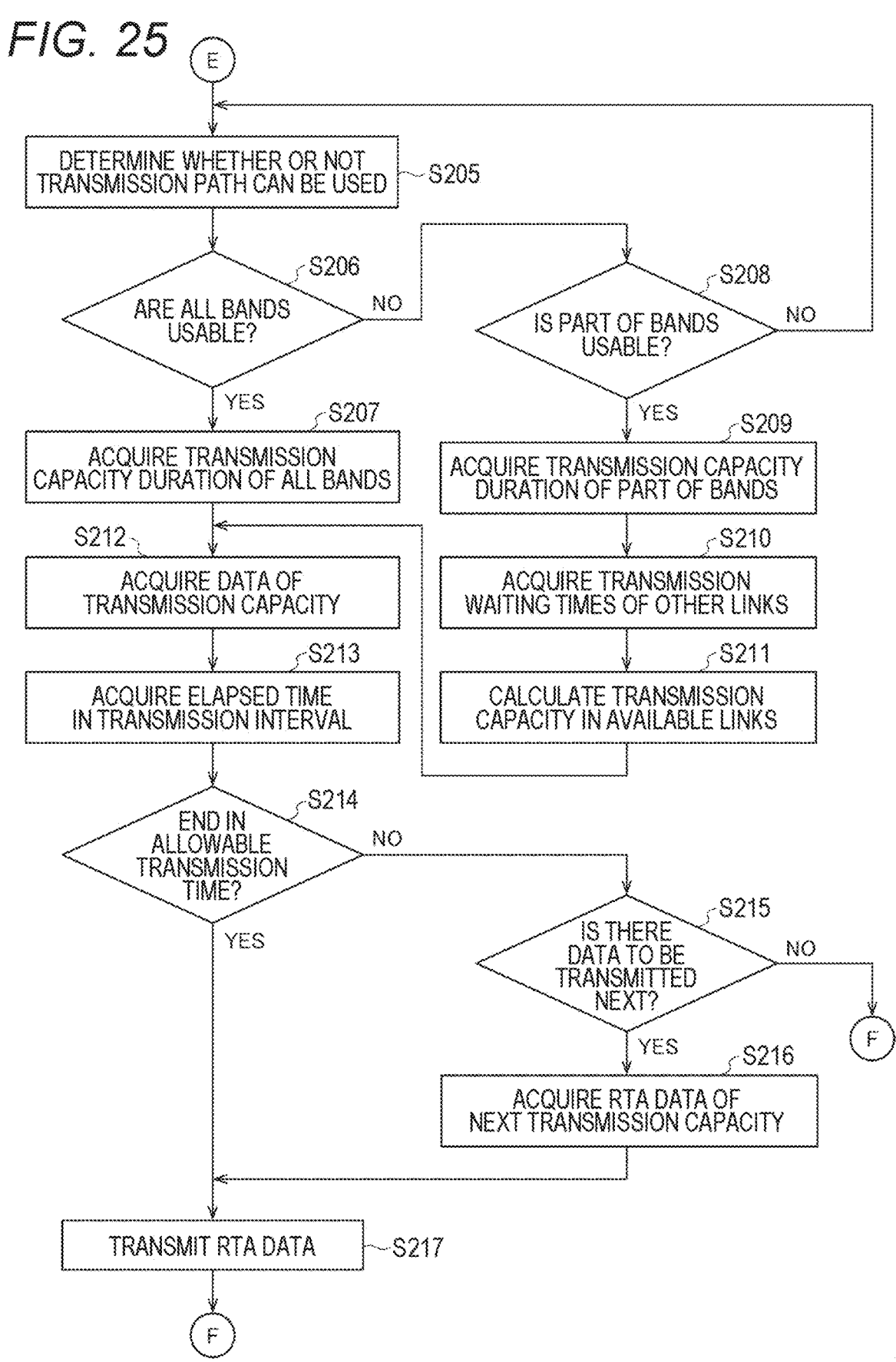
FIG. 25 is a flowchart describing the operation of the transmission side communication device.

In step S204, the transmission control unit 105 determines whether the RTA data is stored in the predetermined transmission buffer 103 (RTA buffer 103-1), and in a case where it is determined that the RTA data is stored ("YES" in S204), the processing proceeds to step S205 in FIG. 25. In step S205, the access control unit 108 determines whether or not the wireless transmission path can be used, and processing of steps S206 to S213 is executed according to a determination result thereof.

That is, for example, in a case where communication using the all bands using a plurality of links is possible ("YES" in S206), the transmission capacity duration of all the bands is acquired (S207). On the other hand, in a case where communication using only the bands of part of links is possible ("YES" in S208), the transmission capacity duration of the part of the bands is acquired (S209), the transmission waiting times of the other links are acquired (S210), and the transmission capacity in only the available links is calculated on the basis of the acquired information (S211).

Then, data of the transmission capacities of all bands or part of bands is acquired (S212), and the elapsed time in the current transmission interval is acquired (S213).

When the processing of step S213 ends, the processing proceeds to step S214. In step S215, the RTA operation management unit 104 determines whether the transmission of the transmission capacity ends within the allowable transmission time on the basis of the acquired elapsed time in the current transmission interval, and the processing of steps S215 to S217 are executed by the transmission control unit 105, the access control unit 108, and the like according to a determination result thereof.

That is, in a case where the transmission of the transmission capacity ends within the allowable transmission time ("YES" in S214), the RTA data is transmitted (S217). On the other hand, in a case where the transmission of the transmission capacity does not end within the allowable transmission time ("NO" in S214), in a case where there is data to be transmitted at the next transmission interval ("YES" in S215), the RTA data of the next transmission capacity is acquired (S216), and the RTA data is transmitted (S217).

Figure 24:
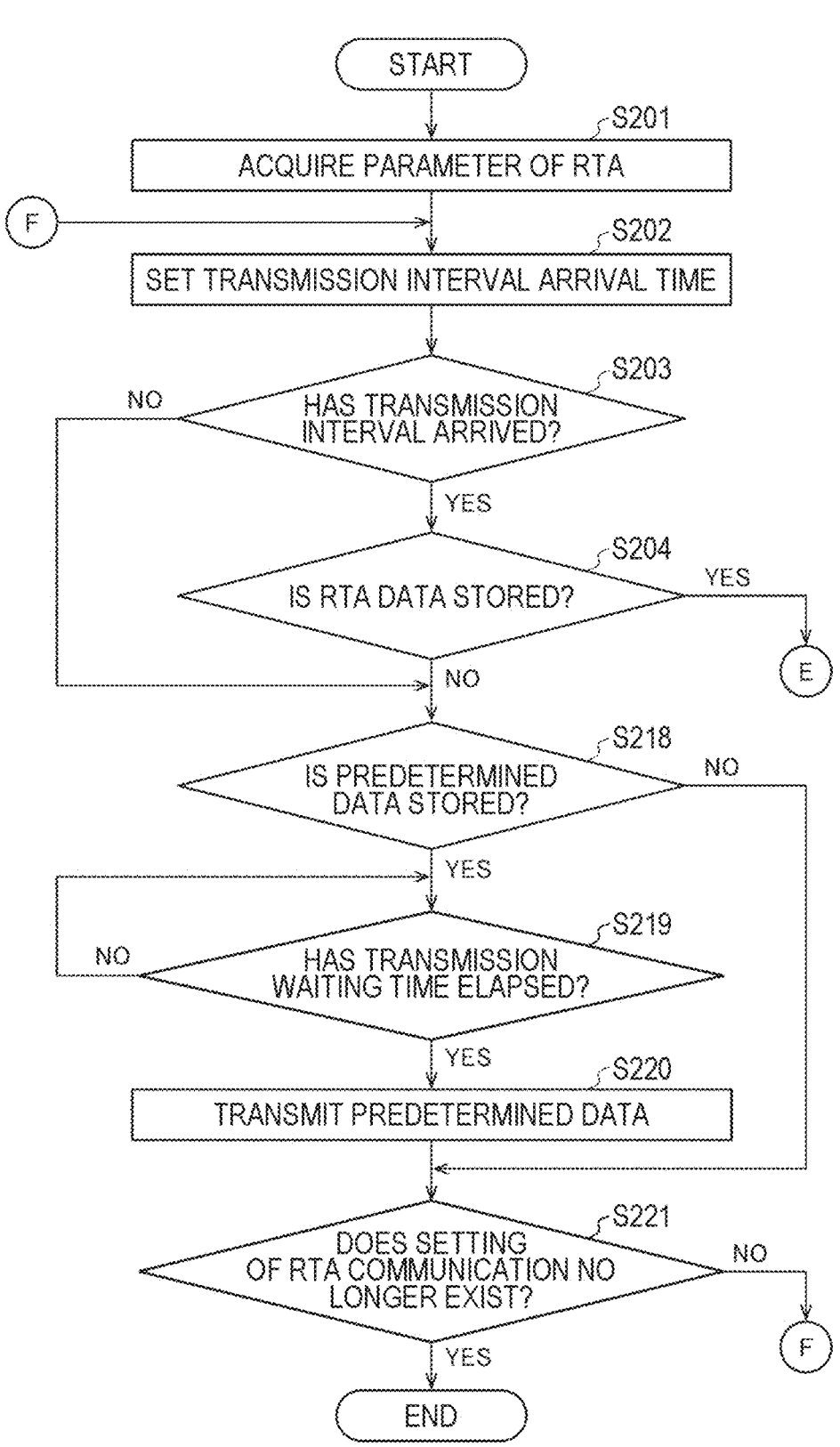
FIG. 24 is a flowchart describing an operation of a transmission side communication device.

Note that, in a case where the processing of step S217 is ended or it is determined in the determination processing of step S215 that there is no data to be transmitted ("NO" in S215), the processing returns to step S202 of FIG. 24, and the subsequent processes are repeated.

On the other hand, in a case where it is determined in the determination processing in step S203 described above that the transmission interval has not arrived ("NO" in S203), or in a case where it is determined in the determination processing in step S204 that there is no RTA data ("NO" in S204), the processing proceeds to step S218 in FIG. 24. In step S218, the transmission control unit 105 determines whether data (voice data or the like) of a conventional access category, that is, predetermined data is stored in the transmission buffer 103, and processing of steps S219 to S221 is executed by the transmission control unit 105, the access control unit 108, and the like according to a determination result thereof.

That is, in a case where the data of the access category is stored ("YES" in S218), the data of the access category is transmitted after the transmission waiting time defined by the access category elapses ("YES" in S219) (S220). Then, in a case where the setting of the RTA communication no longer exists ("YES" in S221), a series of RTA data transmission processing is terminated. Note that, in a case where the setting of the RTA communication is continued ("NO" in S221), the processing returns to step S202, and the RTA data transmission processing is continued.

The flow of processing of the operation of the transmission side communication device 10Tx has been described above.

(Operation on Reception Side)

Next, processing of the operation of the reception side communication device 10Rx will be described with reference to flowcharts of FIGS. 26 and 27.

In step S301, the data analysis unit 114 acquires received data obtained under control of the access control unit 108 or the like, and performs processing of determining whether the acquired received data is data addressed to the own device (S302) and processing of determining whether the data addressed to the own device is RTA data (S303).

In the determination processing of steps S302 and S303, in a case where the received data is data addressed to the own device ("YES" of S302) and is RTA data ("YES" of S303), the processing proceeds to step S304, and the processing of steps S304 to S312 is executed by the RTA operation management unit 104, the data analysis unit 114, the access control unit 108, and the like.

That is, the set parameter of the real time application (RTA) is referred to (S304), and in a case where the data arrives within the allowable delay time ("YES" in S305), the receipt acknowledgment (ACK/NACK) information is constructed (S306). Then, in a case where all pieces of the data of one transmission capacity have been collected ("YES" in S307), the RTA data is output to the application (S309) after the arrival of output time of the data ("YES" in S308).

On the other hand, in a case where the allowable delay time has elapsed ("NO" in S305) and a case of corresponding to the output of the RTA data after delay ("YES" in S310), delay ACK information is constructed (S311), and the RTA data is output to the application (S309). On the other hand, in a case where the output of the RTA data after delay is not supported ("NO" in S310), the delay NACK information is constructed, and the RTA data is discarded without being output.

Figure 27:
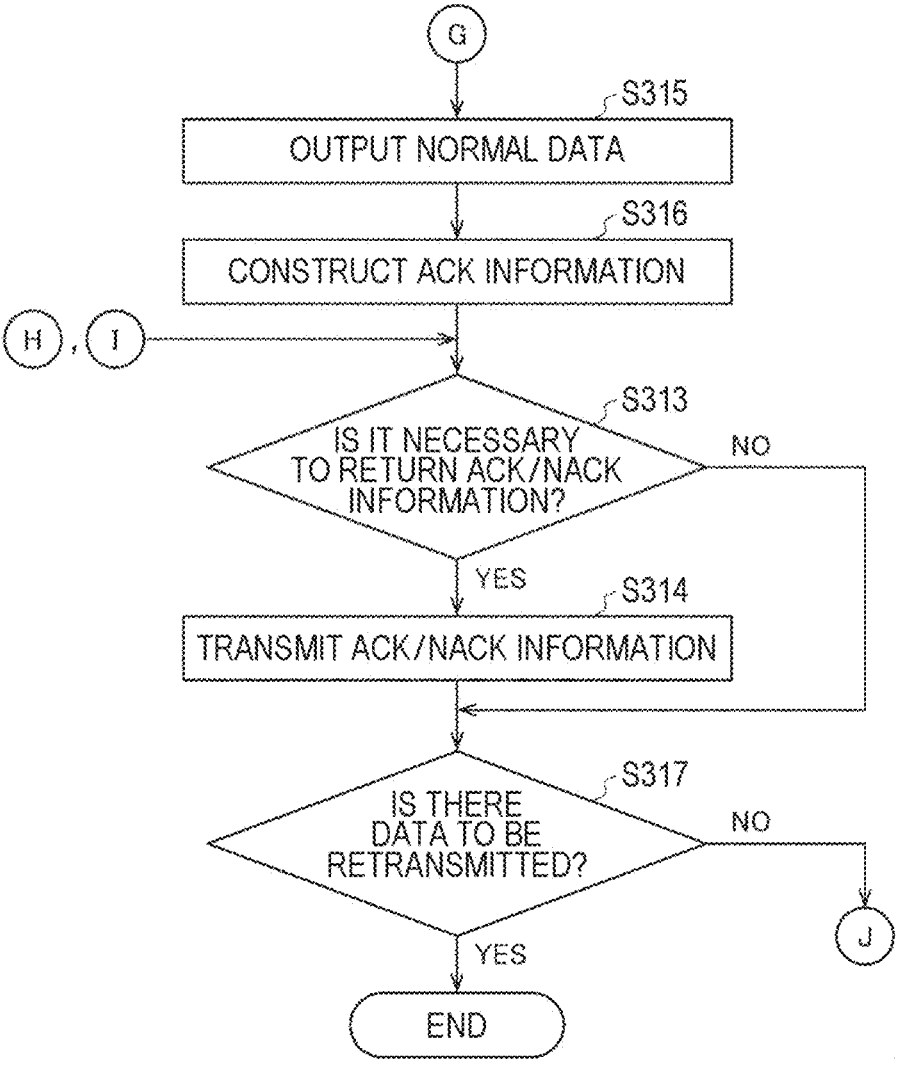
FIG. 27 is a flowchart describing the operation of the reception side communication device.

When the processing of step S309 or S312 ends, the processing proceeds to step S313 of FIG. 27. In step S313, the data analysis unit 114 determines whether it is necessary to return the receipt acknowledgment (ACK/NACK) information, and in a case where it is determined that it is necessary to return the receipt acknowledgment (ACK/NACK) information ("YES" in S313), the processing proceeds to step S314. In step S314, receipt acknowledgment (ACK/NACK) information is transmitted by the access control unit 108 or the like.

Figure 26:
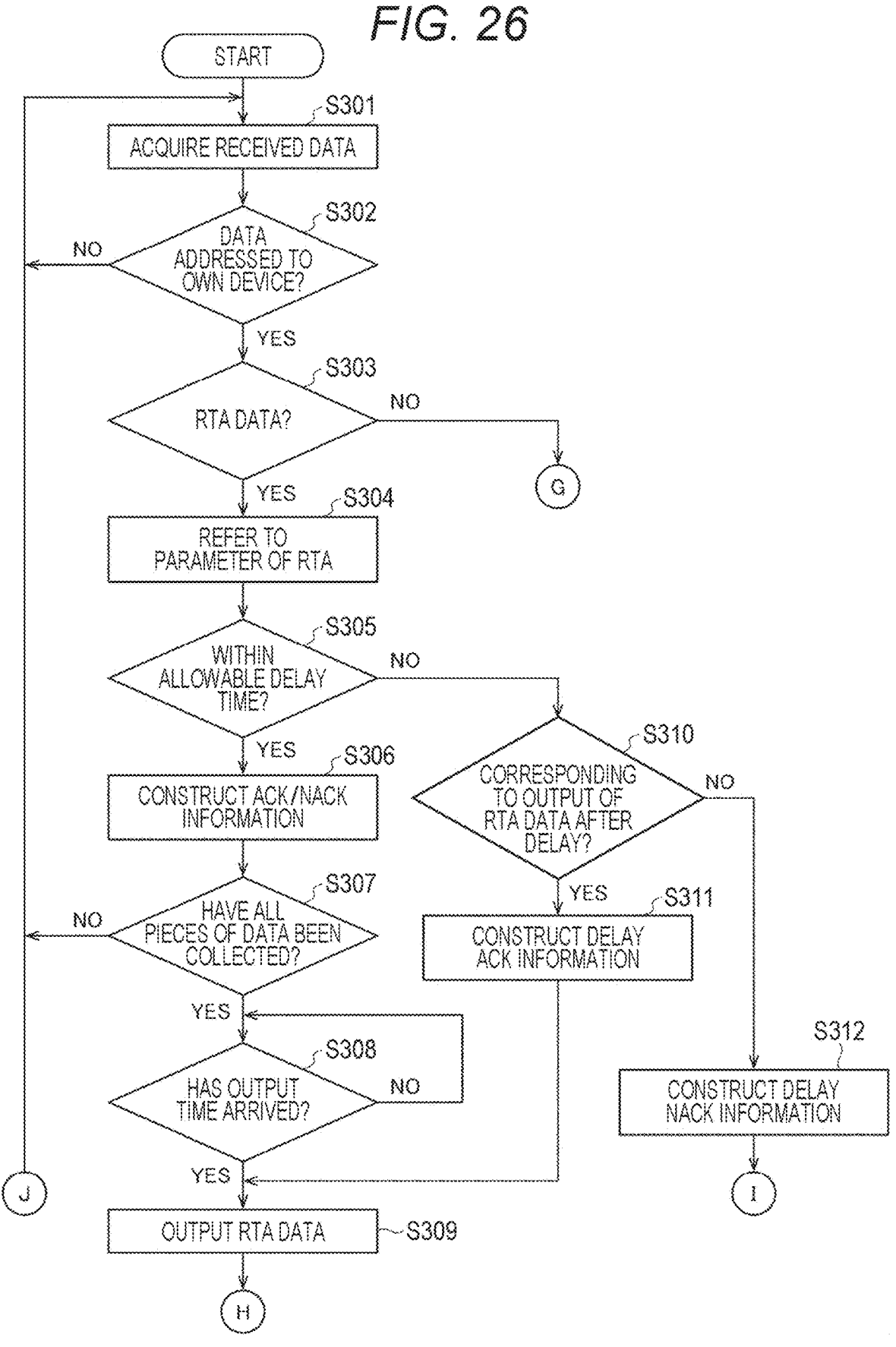
FIG. 26 is a flowchart describing an operation of a reception side communication device.

Furthermore, in a case where it is determined in the determination processing of step S303 in FIG. 26 described above that the data is not the RTA data, that is, for example, normal data ("NO" in S303), the processing proceeds to step S315 in FIG. 27, and the processing of steps S315 and S316 is executed by the RTA operation management unit 104, the data analysis unit 114, the access control unit 108, and the like.

That is, the data is output as normal data that is not the RTA data (S315), and ACK information is further constructed (S316). Then, in a case where the processing of steps S313 and S314 in FIG. 27 described above is executed and a reply is necessary ("YES" in S313), the ACK information is transmitted (S314).

When the processing of step S314 ends, the processing proceeds to step S317. In step S317, the data analysis unit 114 determines the presence or absence of data to be retransmitted, and in a case where there is no data to be retransmitted ("YES" in S317), a series of reception processing is terminated. Note that, in a case where there is data to be retransmitted ("NO" in S317), the processing returns to step S301 in FIG. 26, and the reception processing of data is continued.

The flow of processing of the operation of the reception side communication device 10Rx has been described above.

2. Modification Example

Another Configuration Example

As described above, the transmission side communication device 10Tx can be configured as, for example, the access point AP10 (base station), and the reception side communication device 10Rx can be configured as, for example, the communication terminal STA10 (terminal station). However, the transmission side communication device 10Tx or the reception side communication device 10Rx may be configured as a part (for example, a wireless communication module, a wireless chip, or the like) of a device (component) configuring the access point AP10 or the communication terminal STA10.

Furthermore, for example, the reception side communication device 10Rx configured as the communication terminal STA10 can be configured as an electronic device having a wireless communication function, such as a smartphone, a tablet-type terminal, a game device, a mobile phone, a personal computer, a digital camera, a television receiver, a wearable terminal, or a speaker device.

Moreover, the communication terminal STA10 may be a device that supports only data transmission such as a controller that transmits command data according to an operation of the user, or a device that supports only data reception such as a display device that receives and displays video data.

(Plurality of Links)

In the above description, the case where the two links of the first link (Link #1) and the second link (Link #2) are used as the plurality of links when the multi-link is implemented has been exemplified, but control can be similarly performed in a case of using three or more links such as a case where a third link (Link #3) is further included.

As described above, the present technology proposes a preferential transmission control method capable of transmitting a certain amount of information at a predetermined cycle in order to minimize an influence of a delay even in a wireless communication method in which a random access control delay occurs, such as a wireless LAN system, so that content specified by a user operating in a specific application such as the real time application can be output in a short delay time.

That is, in an environment where a random access control delay occurs such as a wireless LAN system, there is proposed a wireless communication device and a wireless communication method that preferentially transmit data having a predetermined transmission capacity such that a transmission opportunity is obtained in a cycle of a predetermined transmission interval such that data operating in a specific application is output with a short delay time. That is, in order to suppress the influence of the delay as much as possible, a wireless communication device and a wireless communication method are proposed in which data of a certain amount of information is preferentially transmitted at a predetermined cycle.

Furthermore, a method is proposed in which, in a case where transmission cannot be performed in the cycle of the predetermined transmission interval, the next predetermined data is transmitted together, and an identifier indicating that a group of these pieces of data is output with a short delay time is set. Moreover, a control method is proposed in which an allowable delay time is determined, and in a case where data transmission cannot be started by the allowable delay time, the transmission capacity is temporarily increased together with the data to be transmitted at the next transmission interval and the data is transmitted.

Here, the data to be preferentially transmitted may be content data designated in advance by the user, data of a specific application, a predetermined data type, data from a specific communication device to a specific communication device within a specific time, or data for a group of these communication devices, and access control is performed such that an identifier (flag) indicating that a group of these pieces of arbitrary data is output with a short delay time is set, and a transmission opportunity is preferentially obtained at a predetermined cycle.

Furthermore, in order to coexist with other communication even if preferential transmission is performed, it is configured such that the frequency of performing the preferential transmission is controlled, and in order to avoid unnecessary transmission, a transmission capacity of one time and a transmission interval as an interval of the preferential transmission are set. Then, in a case where data transmission is performed within the transmission interval, it is configured such that the data transmission is not performed until the next transmission interval arrives, and by allowing use for transmission by another communication device, the transmission path is not occupied more than necessary.

That is, a predetermined transmission interval is determined in advance, and in a case where data transmission is performed within the transmission interval, the data transmission is not performed until the next transmission interval arrives, and use for transmission by another communication device is allowed, thereby obtaining a communication control method in which the transmission path is not occupied more than necessary.

Regarding parameters for preferentially performing transmission control, specifically, there is proposed a transmission control method in which an amount of information per transmission is calculated as a transmission capacity according to bandwidth information of the link from maximum delay time information in which content of a specific application is allowed to be output, information of a reception cycle in which data information of the content is delivered, buffer capacity information of a reception side communication device, a delay status of access control of the transmission path, and the like, and transmission is performed within an allowable delay time.

Note that, in a case where the output of content is not clearly defined, a reception status of data to be transmitted by the transmission side communication device may be monitored, and in a case where data addressed to a specific communication device is periodically transmitted, the maximum allowable delay time described above may be estimated.

Furthermore, data in which these identifiers are described may be stored in the dedicated transmission buffer, and real time communication desired by a specific application may be implemented by performing control to preferentially transmit data from the transmission side communication device to the reception side communication device on the basis of the transmission parameter.

Note that, in a case where the data transmission is performed depending on the priority order based on the transmission control according to the conventional method, data transmission is performed at a timing not desired by the real time application according to the present technology, and communication is performed on the basis of the transmission parameter at a timing desired by the real time application according to the present technology. Then, in a case where the communication ends or the data does not arrive, these set identifiers and the dedicated transmission buffer are released.

In the present technology, by having the above configuration, data of a specific attribute can be preferentially transmitted, and furthermore, for example, effects as follows can be obtained.

That is, by providing a communication control method for preferentially transmitting a certain amount of information in a predetermined cycle, even in a wireless LAN system in which a random access control delay occurs, a transmission opportunity can be preferentially obtained in a predetermined cycle, and an influence of the delay due to the access control can be suppressed as much as possible.

Furthermore, a predetermined transmission interval is determined in advance, and in a case where data transmission is performed within the transmission interval, the data transmission is not performed until the next transmission interval arrives, and by allowing use for transmission by another communication device, a method of fairly using the transmission path with other data without occupying the transmission path more than necessary can be obtained.

Further, an allowable delay time is determined, and in a case where data transmission cannot be started by the allowable delay time, a transmission capacity is temporarily increased and transmitted together with data to be transmitted at the next transmission interval, so that a delay of access control can be suppressed.

By setting and managing an identifier (flag) in data to be preferentially transmitted, it is possible to output a group of pieces of arbitrary data with a short delay time according to user's needs, such as content data designated by the user in advance, data of a specific application, content data defined by a predetermined attribute, data from a specific communication device to a specific communication device within a specific time, and data for a group of these communication devices.

Note that by storing the data in which these identifiers are described in the dedicated transmission buffer, it is possible to perform control of preferentially transmitting the data from the transmission side communication device to the reception side communication device on the basis of a predetermined transmission parameter while distinguishing the data from other data.

Furthermore, in a case where the data transmission is performed depending on the priority order based on the transmission control by an EDCA method from the related art, it is possible to perform the data transmission at a timing not desired by the real time application to which the present technology is applied, and perform the communication on the basis of the transmission parameter at a timing desired by the real time application.

Moreover, in a case where communication of data of a specific application ends or in a case where there is no more data, it is configured to release the set identifier and the setting of the dedicated transmission buffer, and thus a wireless communication method of performing preferential transmission when necessary is obtained.

(Configuration of Computer)

The processes of respective steps of the above-described flowcharts can be executed by hardware or software. In a case where the series of processes is executed by software, a program constituting the software is installed in a computer of each device.

Here, in the present description, the processing performed by the computer according to the program does not necessarily have to be performed in time series in the order described as the flowchart. That is, the processing performed by the computer according to the program also includes processing that is executed in parallel or individually (for example, parallel processing or object processing).

Furthermore, the program may be processed by one computer (processor) or may be processed in a distributed manner by a plurality of computers. Moreover, the program may be transferred to a distant computer and executed.

Moreover, in the present description, a system means a set of a plurality of components (devices, modules (parts), and the like), and it does not matter whether or not all components are in the same housing.

Note that the embodiments of the present technology are not limited to the above-described embodiments, and various modifications are possible without departing from the gist of the present technology.

Furthermore, each step described in the above-described flowcharts can be executed by one device, or can be executed in a shared manner by a plurality of devices. Moreover, in a case where a plurality of processes is included in one step, the plurality of processes included in the one step can be executed in a shared manner by a plurality of devices in addition to being executed by one device.

Furthermore, the effects described in the present description are merely examples and are not limited, and other effects may be provided.

Note that the present technology can also employ the following configurations.

(1)

A communication device, including a control unit that performs control to estimate a transmission capacity to repeatedly transmit data of a specific attribute by a predetermined amount of information at each predetermined transmission interval, and determine, in a case where a transmission opportunity is acquired by random access control with another communication device, a predetermined transmission capacity to be transmitted according to an elapsed time of a predetermined transmission interval, and transmit the data of the specific attribute.

(2)

The communication device according to (1) above, the control unit stops the execution of the transmission of the data of the specific attribute until a predetermined transmission interval arrives after the transmission of the data having a predetermined transmission capacity.

(3)

The communication device according to (1) or (2) above, in which in a case where an end time of data transmission of a predetermined transmission capacity exceeds an end time of a predetermined transmission interval at a timing when the transmission opportunity is acquired, the control unit adds a transmission capacity to be transmitted at a next transmission interval and transmits the data of the specific attribute.

(4)

The communication device according to any one of (1) to (3) above, in which the control unit sets a predetermined transmission interval and a predetermined transmission capacity by specifying a transmission side communication device and a reception side communication device of data and exchanging communication parameters.

(5)

The communication device according to (4) above, in which the control unit transmits, to the reception side communication device of data, a request for the communication parameters including information regarding a maximum allowable delay of data, information regarding a buffer capacity, information regarding use bandwidths, and information regarding an output format of data.

(6)

The communication device according to any one of (1) to (5) above, in which the control unit sets an identifier that identifies data of a specific attribute, and adds the set identifier to the data of the specific attribute to be transmitted at a predetermined transmission interval.

(7)

The communication device according to any one of (1) to (6) above, further including a buffer that stores data of a specific attribute specified by a user, in which the control unit transmits data of the specific attribute stored in the buffer in a case where the transmission opportunity is acquired.

(8)

The communication device according to any one of (1) to (7) above, in which the control unit determines a predetermined transmission interval by estimating a predetermined time interval from a time at which a transmission side communication device of data receives data of a specific attribute from an application.

(9)

The communication device according to any one of (1) to (8) above, in which the control unit determines a predetermined transmission capacity by estimating a predetermined amount of information that is transmittable at a predetermined transmission interval on the basis of information regarding a maximum allowable delay of data, information regarding a buffer capacity of a reception side communication device, and information regarding use bandwidths.

(10)

The communication device according to (9) above, in which in a case where the transmission opportunity is acquired in any one of the use bandwidths, the control unit determines a predetermined transmission capacity according to a bandwidth available at a point of time when the transmission opportunity is acquired.

(11)

The communication device according to (6) above, in which the control unit cancels setting of the identifier in a case where the transmission of the data of the specific attribute is completed.

(12) A communication method including, by a communication device:

estimating a transmission capacity to repeatedly transmit data of a specific attribute by a predetermined amount of information at each predetermined transmission interval; and determining, in a case where a transmission opportunity is acquired by random access control with another communication device, a predetermined transmission capacity to be transmitted according to an elapsed time of a predetermined transmission interval, and transmitting the data of the specific attribute.

(13)

A communication device, including a control unit that sets reception of data of a specific attribute by specifying a transmission side communication device and a reception side communication device of data and exchanging communication parameters, and periodically receives the data of the specific attribute having a predetermined transmission capacity at each predetermined transmission interval.

(14)

The communication device according to (13) above, in which the control unit transmits a notification of the communication parameter including information regarding a maximum allowable delay of data, information regarding a buffer capacity, information regarding use bandwidths, and information regarding an output format of data.

(15)

The communication device according to (14) above, in which the control unit recognizes data in which a specific identifier is set among received data as the data of the specific attribute, and stores the data of the specific attribute in a buffer that preferentially outputs the data of the specific attribute.

(16)

The communication device according to (14) above, in which the control unit outputs the received data of the specific attribute to the application before a maximum allowable delay time elapses.

(17)

The communication device according to (15) above, in which in a case of receiving data in which the specific identifier is set, the control unit outputs the data of the specific attribute to an application on the basis of an output format of the data of the specific attribute.

(18)

The communication device according to (17) above, in which the control unit cancels setting of the identifier and setting of the buffer in a case where transmission of the data of the specific attribute is completed.

(19)

The communication device according to any one of (13) to (18) above, in which the control unit constructs and transmits information regarding normal reception or retransmission of data on the basis of a maximum allowable delay time.

(20)

A communication method, by a communication device:

setting reception of data of a specific attribute by specifying a transmission side communication device and a reception side communication device of data and exchanging communication parameters; and controlling periodic reception of the data of the specific attribute having a predetermined transmission capacity at each predetermined transmission interval.

REFERENCE SIGNS LIST

1-1 Wireless LAN system
10 Communication device
11 Network connection module
12 Information input module
13 Device control module
14 Information output module
15 Wireless communication module
101 Interface
102 RTA data determination unit
103 Transmission buffer
103-1 RTA buffer
103-2 AC_VO buffer
103-3 AC_VI buffer
103-4 AC_BE Buffer
103-5 AC_BG buffer
104 RTA operation management unit
105 Transmission control unit
106 Timing control unit
107 Transmission frame construction unit
108 Access control unit
109-1, 109-2 Transmission processing unit
110 Antenna control unit
111 Antenna group
112-1, 112-2 Upper layer reception processing unit
113 Reception frame extraction unit
114 Data analysis unit
115 Reception buffer
115-1 RTA reception buffer
115-2 Reception buffer
116 Output data construction unit

The invention claimed is:

1. A communication control device configured to control a communication device, comprising:

control circuitry that performs control to:

estimate a transmission capacity of the communication device to repeatedly transmit data having a specific attribute by a predetermined amount of information at each of a plurality of predetermined transmission intervals, determine, in a case where a transmission opportunity is acquired by the communication device via random access control with another communication device, a predetermined transmission capacity of the communication device according to an elapsed time of a first predetermined transmission interval of the plurality of intervals; and control the communication device to repeatedly transmit the data having the specific attribute at the plurality of intervals, to include transmitting the data having the specific attribute in a remainder of time, after the elapsed time, of the first predetermined transmission interval.

2. The communication control device according to claim 1, wherein, after the data having the specific attribute is transmitted in the remainder of time of the first predetermined transmission interval, the control circuitry controls the communication device to pause the transmission of the data having the specific attribute until a second predetermined transmission interval of the plurality of intervals arrives.

3. The communication control device according to claim 2, wherein, in a case where an end time of the data transmission of the predetermined transmission capacity exceeds an end time of the second predetermined transmission interval at a timing when the transmission opportunity is acquired, the control circuitry adds a transmission capacity to be used at a next transmission interval for transmitting a remainder of the data having the specific attribute.

4. The communication control device according to claim 1, wherein the control circuitry sets the first predetermined transmission interval and the predetermined transmission capacity by:

specifying a transmission side communication device and a reception side communication device for the data; and exchanging communication parameters of the transmission side communication device and the reception side communication device.

5. The communication control device according to claim 4, wherein the control circuitry controls the communication device to transmit, to the reception side communication device, a request for the communication parameters, the communication parameters including:

information regarding a maximum allowable delay of the data having the specific attribute, information regarding a buffer capacity of the reception side communication device, information regarding one or more bandwidths available for the transmission of the data having the specific attribute, and information regarding an output format of the data having the specific attribute that is acceptable to the reception side communication device.

6. The communication control device according to claim 1, wherein the control circuitry:

sets an identifier that identifies the data having the specific attribute, and adds the set identifier to the data having the specific attribute.

7. The communication control device according to claim 6, wherein the control circuitry cancels setting of the identifier in a case where the transmission of the data having the specific attribute is completed.

8. The communication control device according to claim 1, wherein the communication device has a plurality of buffers, the plurality of buffers including a specific buffer that stores the data having the specific attribute, wherein the control circuitry controls the communication device to transmit the data having the specific attribute by accessing the data having the specific attribute that is stored in the specific buffer.

9. The communication control device according to claim 1, wherein the control circuitry determines the predetermined transmission interval based on an estimate of a predetermined time when a transmission side communication device is able to receive the data having the specific attribute from an application.

10. The communication control device according to claim 1, wherein the control circuitry determines the predetermined transmission capacity by estimating the predetermined amount of information that is transmittable at the predetermined transmission interval on a basis of:

information regarding a maximum allowable delay of the data having the specific attribute, information regarding a buffer capacity of a reception side communication device, and information regarding a bandwidth that is available to transmit the data having the specific attribute.

11. The communication control device according to claim 10, wherein, in a case where the transmission opportunity is acquired in any one of a plurality of available bandwidths, the control circuitry determines the predetermined transmission capacity according to the bandwidth that is available at a point of time when the transmission opportunity is acquired.

12. The communication control device according to claim 1, wherein the specific attribute is an attribute related to data latency of a real time application (RTA).

13. A method performed by communication control device configured to control a communication device, the communication method comprising:

estimating a transmission capacity of the communication device to repeatedly transmit data having a specific attribute by a predetermined amount of information at each of a plurality of predetermined transmission intervals;

determining, in a case where a transmission opportunity is acquired by the communication device via random access control with another communication device, a predetermined transmission capacity of the communication device according to an elapsed time of a first predetermined transmission interval of the plurality of the predetermined transmission intervals; and controlling the communication device to repeatedly transmit the data having the specific attribute at the plurality of intervals, to include transmitting the data having the specific attribute in a remainder of time, after the elapsed time, of the first predetermined transmission interval.

14. The method according to claim 13, wherein the specific attribute is an attribute related to data latency of a real time application (RTA).

* * * * *